(12) United States Patent
Levchin et al.

(10) Patent No.: US 11,455,683 B2
(45) Date of Patent: Sep. 27, 2022

(54) REFINANCING TOOLS FOR PURCHASING TRANSACTIONS

(71) Applicant: Affirm, Inc., San Francisco, CA (US)

(72) Inventors: Max Levchin, San Francisco, CA (US); Christopher Beckmann, San Francisco, CA (US); Jeffrey Howard Kaditz, San Francisco, CA (US); Roberto Novoa, San Francisco, CA (US); Andrew Gettings Stevens, San Francisco, CA (US); Manuel De Jesus Arias, San Francisco, CA (US); Aaron Ng Ligon, San Francisco, CA (US)

(73) Assignee: AFFIRM, INC., San Francisco, CA (US)

( * ) Notice: Subject to any disclaimer, the term of this patent is extended or adjusted under 35 U.S.C. 154(b) by 0 days.

(21) Appl. No.: 17/395,864

(22) Filed: Aug. 6, 2021

(65) Prior Publication Data

US 2021/0366040 A1 Nov. 25, 2021

Related U.S. Application Data

(63) Continuation of application No. 17/219,305, filed on Mar. 31, 2021, which is a continuation of application No. 14/920,573, filed on Oct. 22, 2015, now Pat. No. 11,030,685, which is a continuation-in-part of application No. 14/712,790, filed on May 14, 2015.

(60) Provisional application No. 62/067,418, filed on Oct. 22, 2014, provisional application No. 62/048,186, filed on Sep. 9, 2014, provisional application No. 61/992,984, filed on May 14, 2014.

(51) Int. Cl.
*G06Q 40/02* (2012.01)

(52) U.S. Cl.
CPC .............................. *G06Q 40/025* (2013.01)

(58) Field of Classification Search
CPC ................................................ G06Q 40/025
USPC ....................................................... 705/3–44
See application file for complete search history.

(56) References Cited

U.S. PATENT DOCUMENTS

| 5,878,403 A | 3/1999 | DeFrancesco |
| 7,069,234 B1 | 6/2006 | Cornelius |
| 7,542,935 B2 * | 6/2009 | Fuentes-Torres ...... G06Q 20/10 705/35 |
| 7,716,125 B2 | 5/2010 | Shavit |
| 7,877,326 B2 | 1/2011 | Koch |

(Continued)

OTHER PUBLICATIONS

Colombia's most expensive and cheapest credit cards in June: learn how to calculate your spending with plastic money. CE Noticias Financieras, English ed [Miami] Jun. 8, 2022.*

(Continued)

*Primary Examiner* — Frantzy Poinvil
(74) *Attorney, Agent, or Firm* — Burr & Forman LLP

(57) ABSTRACT

A web based finance system allows users to refinance past eligible purchasing transactions. The system can include a system server(s) which is in communication through a network with client computing devices associated with customers. The server can receive customer information and determine a refinancing value range based upon the user has a bank account and/or credit risk rating information. The server can identify prior eligible credit card purchases for refinancing and the customer can select one or more purchases for refinancing and the refinancing loan terms.

20 Claims, 21 Drawing Sheets

(56) References Cited

U.S. PATENT DOCUMENTS

| | | | |
|---|---|---|---|
| 8,078,527 B2 | 12/2011 | Cerise | |
| 8,145,565 B1 | 3/2012 | Voutour et al. | |
| 8,321,339 B2 | 11/2012 | Imrey | |
| 8,417,627 B2 | 4/2013 | Cerise | |
| 8,452,683 B2 | 5/2013 | Bayne | |
| 8,458,093 B1 | 6/2013 | Smith | |
| 8,473,858 B2 | 6/2013 | Buchanan | |
| 8,589,282 B1 | 11/2013 | Jackson | |
| 8,694,390 B2 * | 4/2014 | Imrey | G06Q 40/02 705/26.4 |
| 8,719,732 B2 | 5/2014 | Diggdon | |
| 8,732,082 B2 | 5/2014 | Karim | |
| 8,782,951 B2 | 7/2014 | Dickison | |
| 10,198,766 B1 * | 2/2019 | Dharmadhikari | G06F 17/00 |
| 10,664,907 B2 * | 5/2020 | Rieger | G06Q 40/025 |
| 11,276,048 B2 * | 3/2022 | Liu | G06Q 20/322 |
| 2002/0069122 A1 | 6/2002 | Yun et al. | |
| 2003/0009402 A1 * | 1/2003 | Mullen | G06Q 40/12 705/35 |
| 2003/0036996 A1 | 2/2003 | Lazerson | |
| 2003/0074305 A1 * | 4/2003 | Gallon | G06Q 20/04 705/37 |
| 2004/0267611 A1 | 12/2004 | Hoerenz | |
| 2005/0240521 A1 * | 10/2005 | Fuentes-Torres | G06Q 40/00 705/39 |
| 2007/0106584 A1 | 5/2007 | Irwin | |
| 2008/0177655 A1 * | 7/2008 | Zalik | G06Q 40/02 705/38 |
| 2009/0024478 A1 | 1/2009 | Dixon | |
| 2011/0313919 A1 | 12/2011 | Evans | |
| 2012/0059757 A1 | 3/2012 | Hurwitz et al. | |
| 2012/0265687 A1 | 10/2012 | Dilip | |
| 2012/0317014 A1 | 12/2012 | Cerise | |
| 2013/0179325 A1 | 7/2013 | Perlly | |
| 2013/0179338 A1 | 7/2013 | Evans | |
| 2013/0185189 A1 | 7/2013 | Stewart | |
| 2013/0325695 A1 | 12/2013 | Imrey | |
| 2013/0339219 A1 | 12/2013 | Bernheimer et al. | |
| 2014/0012737 A1 | 1/2014 | Evans | |
| 2014/0258088 A1 * | 9/2014 | Belarj | G06Q 20/405 705/38 |
| 2014/0324731 A1 | 10/2014 | Imrey | |
| 2015/0127527 A1 * | 5/2015 | Eide | G06Q 20/10 705/39 |
| 2015/0193743 A1 | 7/2015 | Simmons | |
| 2015/0206234 A1 | 7/2015 | Forrester et al. | |
| 2015/0278948 A1 * | 10/2015 | Don | G06Q 20/12 705/38 |
| 2015/0324901 A1 | 11/2015 | Starikova | |
| 2016/0171555 A1 | 6/2016 | Buerger | |
| 2020/0160295 A1 * | 5/2020 | Jagalpure | G06Q 20/204 |
| 2020/0250748 A1 * | 8/2020 | Rieger | G06Q 30/012 |

OTHER PUBLICATIONS

Singh, et al., "Study of Consumer Perception of Digital Payment Mode", Journal of Internet Banking and Commerce 22.3: 1-14, ARRAY Development, Dec. 2017.*

Borrowers out to know how much the are being penalized, published on May 3, 2013.

Lenders offer easier ways to finance remodel, published on Sep. 9, 2006.

Office Action from related U.S. Appl. No. 14/712,790 dated Aug. 18, 2021, all pages cited in its entirety.

* cited by examiner

| Affirm | Loans | Cards | Support |

You have 3 eligible purchases right now

You can transfer one purchase between $200-$3,000. Learn More       Add Card

221
$810.32
Casper
SEP 17 - Visa ****1234
Transfer
227

223
$482.67
Amazon
SEP 23 - Visa ****1234
Transfer
227

225
$247.51
Sears
SEP 22 - Visa ****1234
Transfer
227

Your purchases from categories not eligible for transfer $546.28
Chase Payment
Card Payment
SEP 17 - Visa ****1234
Shoud this be eligible?
Let us know — 231

Affirm                    Loans    Cards    Support

You have No eligible purchases right now — 225
You can transfer one purchase between $200-$3,000. Learn More — 235                    Add Card > Tip: When you make an eligible purchase through your connected credit card, you can save revolving fees when you transfer purchase to Affirm.

Your purchases from categories not eligible for transfer $546.28
Chase Payment
Card Payment
SEP 17 - Visa ****1234
Shoud this be eligible?
Let us know — 231

FIG. 22

Thanks for letting us know. We will send you an email notification if eligibility status of this purchase is updated.

Your card ending in ****1234 got disconnected. Please login again to see eligible purchases.

Connect Card Again    Cancel 245                   247

Sorry, your connected card got disconnected. Please login again to see eligible purchases.

FIG. 25

REFINANCING TOOLS FOR PURCHASING TRANSACTIONS

CROSS REFERENCE TO RELATED APPLICATIONS

This application is a continuation of pending U.S. patent application Ser. No. 17/219,305, "Refinancing Tools For Purchasing Transactions" filed on Mar. 31, 2021, which itself was a continuation of U.S. patent application Ser. No. 14/920,573, "Refinancing Tools For Purchasing Transactions" filed Oct. 22, 2015, which issued as U.S. Pat. No. 11,030,685, and which claims priority to U.S. Provisional Patent Application No. 62/067,418, "Refinancing Tools For Purchasing Transactions" filed Oct. 22, 2014. U.S. patent application Ser. No. 14/920,573 is a continuation in part of pending U.S. patent application Ser. No. 14/712,790, "Tools For Purchasing Transactions" filed May 14, 2015 which claims priority to U.S. Provisional Patent Application No. 61/992,984, "Tools For Purchasing Transactions" filed May 14, 2014 and U.S. Provisional Patent Application No. 62/048,186, "Tools For Purchasing Transactions" filed Sep. 9, 2014 which are all hereby incorporated by reference in their entireties.

BACKGROUND

When purchases are made by customers from merchants, the typical transaction involves selecting the goods or services and paying for them with traditional means such as cash, checks, credit cards or debit cards. These traditional means are not adjustable and if credit cards are used, a very high fixed interest rate can be charged. Credit card interest is the principal way in which credit card issuers generate revenue. A card issuer is a bank or credit union that gives a consumer a card and an account number that can be used with various payees to make payments and borrow money. The bank pays the payee and can collect a percentage of the purchase and then charge the cardholder interest over the time the money remains borrowed. A finance charge billed to the cardholder from the credit card company can be equal to daily compound interest. Thus, an APR of 29.99% carries an effective annual rate of 34.96% based upon compounding interest daily for a year with 12 billing periods and 365 days.

A credit card can have a grace period which is a period of time where no interest is charged on an ending statement balance that is paid by the due date. The duration of the credit card grace period can be approximately 30 days or one month. If the required outstanding balance is not paid within the grace period, then the normal interest rate calculation method is used to calculate a revised outstanding balance based upon compound interest. The grace period allows cardholders to use credit cards for the convenience of having one invoice payable once per month rather than having many separate cash or check transactions. The grace period also allows credit card clients to keep money invested at a return until the money must be moved to pay the credit card balance.

What is needed is a system that provides an improved system and method for providing purchasing options for customers to purchase goods and services from merchants with lower interest rates and lower total costs.

SUMMARY OF THE INVENTION

The present invention is directed towards systems and methods for facilitating the refinancing of purchasing transactions. The system can include one or more system servers that communicate through a network with customer computing devices such as mobile smart phone devices. When a customer wishes to use the refinancing services, an application program (app) can be downloaded to the customer's mobile computing device or other customer computing device. Alternatively, the customer's computing device can communicate with the refinancing system server using a web browser to log into a secure server web page.

The customer can interact with the app's user interface to input personal information which can be used to approve the customer for the refinancing system. The input information can be analyzed by the system to determine a credit risk rating for the customer and screen fraudulent users. Users can also input bank account information through the user interface of the app to link a bank account(s) to the refinancing system. The system can check the user's bank account information and FICO score or equivalent credit risk rating to determine refinancing offers for the customer. Users with higher assets and credit risk ratings can be authorized by the system to receive refinancing for higher purchase values and lower interest rates. In contrast people with fewer assets and lower credit risk ratings can receive refinancing for lower purchase values and higher interest rates. In some cases, the system can determine that the user may not have sufficient assets or credit risk rating, or the system may detect fraudulent activity linked to the user. In those cases, the system may not approve a customer for the refinancing service.

Once a customer is approved for the refinancing service, the system can inform the customer of a range of dollar value that can be refinanced through the user interface of the mobile computing device (or other computing device). For example, the system may display a message stating that the customer is eligible to transfer one recent credit card purchase with a value between $200-$3,000 to a third party refinance service. The user can input information for one or more credit cards. The system server can access the customer's past credit card purchase information and display refinance eligible purchases. The system may also display purchases that are not eligible for refinancing. The user can then select a purchase for refinancing through the user interface on the mobile device. In other embodiments, the customer may select multiple purchases for refinancing which can cumulatively be within the value range authorized by the system.

The user can then be offered loan terms for the refinancing. In some embodiments, the repayment options can vary in duration and interest rate. The refinance loan terms can vary depending upon the credit risk rating of the customer. A customer with a super prime credit risk rating can be offered a higher refinancing amount and lower interest rate than a customer with a prime or subprime credit risk rating. The customer can select the loan repayment terms and pay off the loan according to the selected repayment terms. Examples of the user interface used for selecting the refinance repayment loan terms are described in co-pending U.S. patent application Ser. No. 14/712,790, "Tools For Purchasing Transactions" which is incorporated by reference. The described refinance service can provide longer repayment duration with lower interest rates than credit cards.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings:

FIGS. 9A-9D illustrate screen shots of embodiments of a user interface for providing security information for the bank sign in.

FIGS. 10A-10B illustrate screen shots of embodiments of a user interface for providing additional details for security reasons for the bank sign in.

FIG. 16 illustrates a screen shot of an embodiment of a user interface for credit card sign in.

FIG. 17 illustrates a screen shot of an embodiment of a user interface for providing answers to security questions for credit card sign in.

FIG. 21 illustrates a screen shot of an embodiment of a user interface separately listing different financial transactions that are eligible and not eligible for transfer.

FIG. 22 illustrates a screen shot of an embodiment of a user interface informing the user there are no financial transactions that are eligible for transfer.

FIG. 23 illustrates a screen shot of an embodiment of a user interface confirming receipt of a financial transaction transfer eligibility review.

FIGS. 24 and 25 illustrate screen shot of embodiments of a user interface informing the user that a user's credit card has been disconnected.

DETAILED DESCRIPTION

The present invention is directed toward systems and methods for facilitating the refinancing of purchasing transactions that can be used to provide customized and flexible purchase and credit terms. In contrast to these traditional credit methods, the inventive system can provide a wide range of payment terms that are substantially different than the traditional payment means. The inventive system can adapt to an individual customer's unique cash flow situation to provide a loan that best fits the customer's ability to repay the loan.

Figure 1:
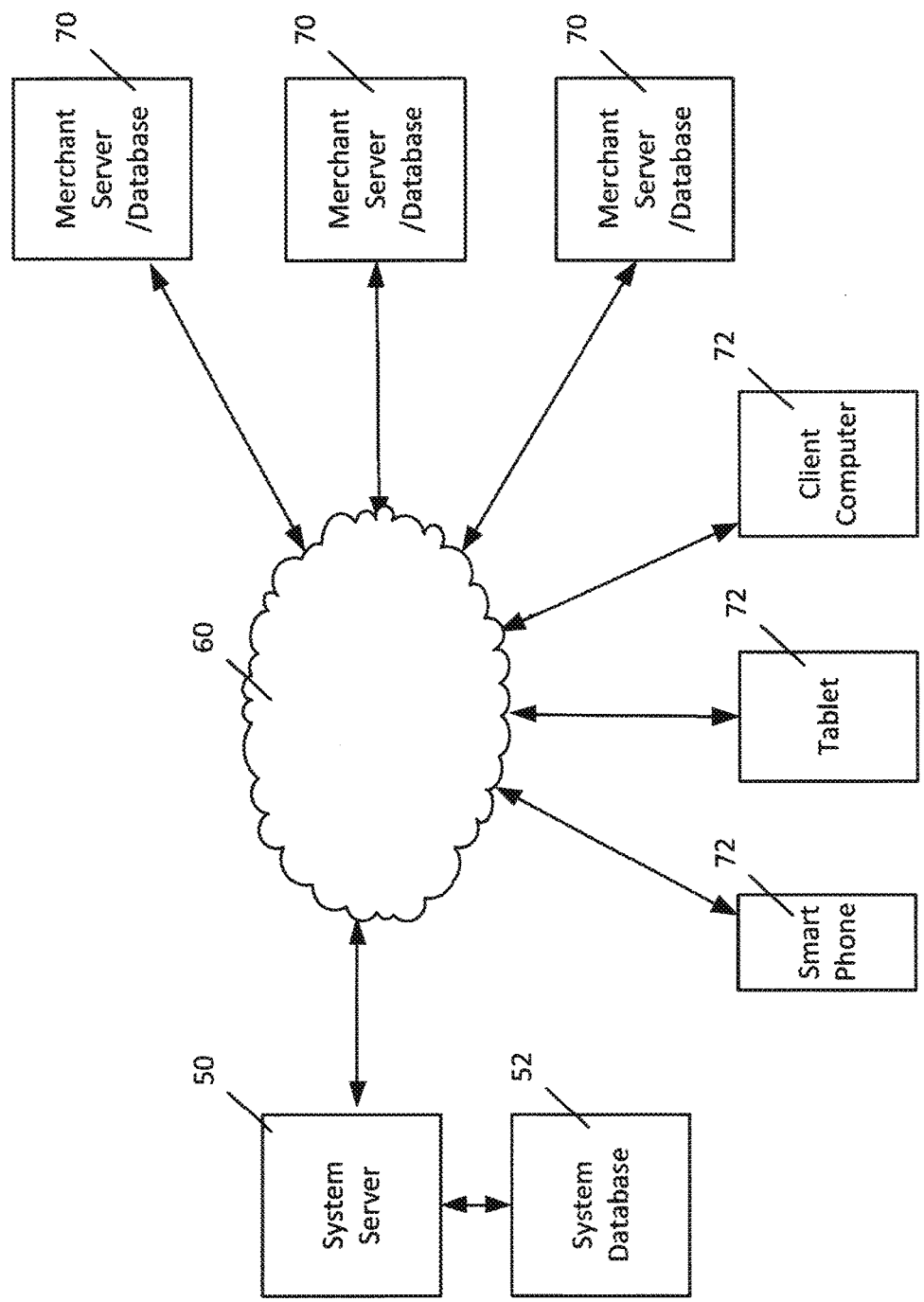
FIG. 1 illustrates a block diagram of an embodiment of a system for facilitating purchasing transactions.

Aspects of the one or more embodiments described herein may be implemented on one or more computers executing software instructions. The computers may be networked in a client-server arrangement or similar distributed computer network. With reference to FIG. 1, in an embodiment, the inventive system can include a system server 50, which is used with a plurality of mobile and other computing devices ("mobile devices") 72. The system server may work with other merchant and service provider servers 70 to process communications from the mobile devices 72. For example, in an embodiment, the system server 50 can provide a "white-label" for other merchant servers/databases 70. The system server 50 may have a system database 52 for storing information about the users and their mobile devices 72. The system server 50 can also communicate with other merchant servers/databases 70 to obtain information and verify information about the mobile devices 72 and the users of the mobile devices 72. The server 50 is coupled, directly or indirectly, to one or more merchant servers/databases 70 and a plurality of mobile devices 72 through a network. The network interface between the system server 50, merchant servers/databases 70 and mobile devices 72 may include one or more routers that serve to buffer and route the data transmitted between the server and client computers. The network may be the Internet, a Wide Area Network (WAN), a Local Area Network (LAN), or any combination thereof.

Figure 2:
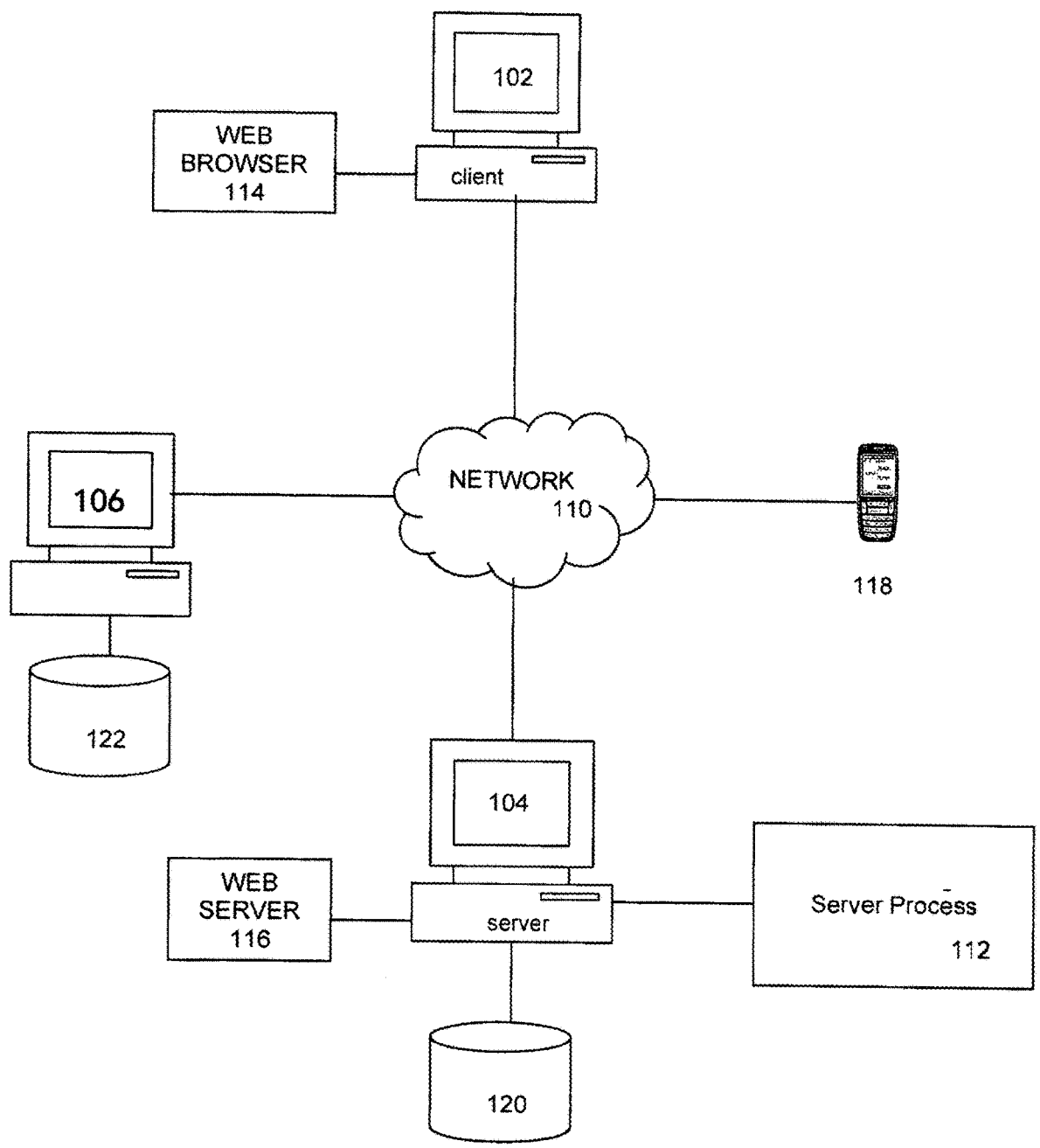
FIG. 2 is a block diagram of a computer network system that implements embodiments of a distance-based advertising delivery system.

In one embodiment with reference to FIG. 2, the system server 104 is a World-Wide Web (WWW) server that stores data in the form of web pages and transmits these pages as Hypertext Markup Language (HTML) files over the Internet 110 to the client computer(s) 102, 118. For this embodiment, the client computers 102, 118 typically runs a web browser program 114 to access the web pages served by system server 104 and merchant servers 106 and merchant databases 122.

In one embodiment, a system server 104 in network system 100 is a server that executes financing for the purchase of goods and/or service processing on the client computers 102, 118. Server process 112 may represent one or more executable programs modules that are stored within network server 104 and executed locally within the server. Alternatively, however, it may be stored on a remote storage or processing device coupled to server 104 or network 110 and accessed by server 104 to be locally executed. In a further alternative embodiment, the sales process 112 may be implemented in a plurality of different program modules, each of which may be executed by two or more distributed server computers coupled to each other, or to network 110 separately.

For an embodiment in which network 110 is the Internet, system server 104 executes a web server process 116 to provide HTML documents, typically in the form of web pages, to client computers coupled to the network. To access the HTML files provided by server 104, client computer 102 executes a web browser process 114 that accesses web pages available on server 104 and other Internet server sites, such as supplemental servers, which may also be a network computer. The system server 104 can provide a "white-label" for other merchant servers 106 that can sell goods or services to clients. Alternatively, in an embodiment, the system server 104 can provide financing to clients 102, 118 that can be independent of transactions with the merchant servers 106. The merchant servers 106 can be coupled to merchant databases 122 that store merchant information. The client computer 102 may access the Internet 110 through an Internet Service Provider (ISP). Data for any of the customers, goods and services purchased, and merchants may be stored by a data store 120 that is closely or loosely coupled to any of the server 104 and/or client 102.

The client computers 102, 118 may be a smart phone or another computing device such as a computer, personal digital assistant, or similar computing device that provides access to the Internet network 110 and a sufficient degree of user input and processing capability to execute or access any required client-side application. More specifically, the client computers 102, 118 include a processor, memory, input and display. The client computers 102 and 118 may be coupled to the server computer 104 over a wired connection, a wireless connection or any combination thereof. The client computer 118 can include a touch screen display, which can function to display user interfaces with loan information and provide an input mechanism for load adjustments.

In addition to providing communications between the system components, the inventive system can also control and monitor the transfer of funds between the financing service provider, merchants and client customers. For example, when customers obtain credit from the financing service provider, the merchant can be paid directly by the financing service provider by any means such as: electronic funds transfers, wire transfers, checks, or any other payment methods. When customers make payments on the financing used to make a purchase, those payments can similarly be made using debit cards, electronic funds transfers, wire transfers, checks, automated checking payments or any other payment methods.

The inventive systems and methods can be used in combination with purchasing systems described in U.S. patent application Ser. No. 14/573,334, "System and Method of Transacting" filed Dec. 17, 2014, which are hereby incorporated by reference in its entirety. The inventive system and method is used for providing financial services for instantaneous credit for financial transactions, which can include purchasing goods or services. The "credit determination" can be a pre-approval process for shopping at a merchant website or physical store, enabling the merchant to offer, or enabling a customer to ask for credit before or during or after shopping. An offer for potential credit is presented to or accessed by the customer and the customer can "apply for credit" using their phone number and/or other identifying information (where needed), regardless of whether or not the customer has shopped with a merchant or the credit provider's payment system before. The credit provider can take the user's identifying information, and/or the merchant information and/or the transaction information (e.g. items already in cart, or items previously purchased) and can provide credit for that customer to spend at that merchant. Credit determination can be based upon customer information such as: FICO score, financial history such as bank/credit accounts, employment duration, job title, mobile phone information, and/or other available information. The customer information may be stored on credit provider databases. In an embodiment, the credit can be contingent upon specific products or services and possibly further limited to specific products or sale items.

The credit provider may require customers with extremely low estimated credit determinations to provide additional information such as a credit card or bank account number before credit is offered. If the customer already has a personal account with the credit provider, the customer can log into the credit provider's website to access the customer's existing account using the passwordless login system. In an embodiment, the system may store customer account information and may allow customers to access their account information through a passwordless login system such as the system described in U.S. Provisional application Ser. No. 14/578,353, "System and Method For Passwordless Login" filed Dec. 20, 2014, which is hereby incorporated by reference in its entirety.

Figure 3:
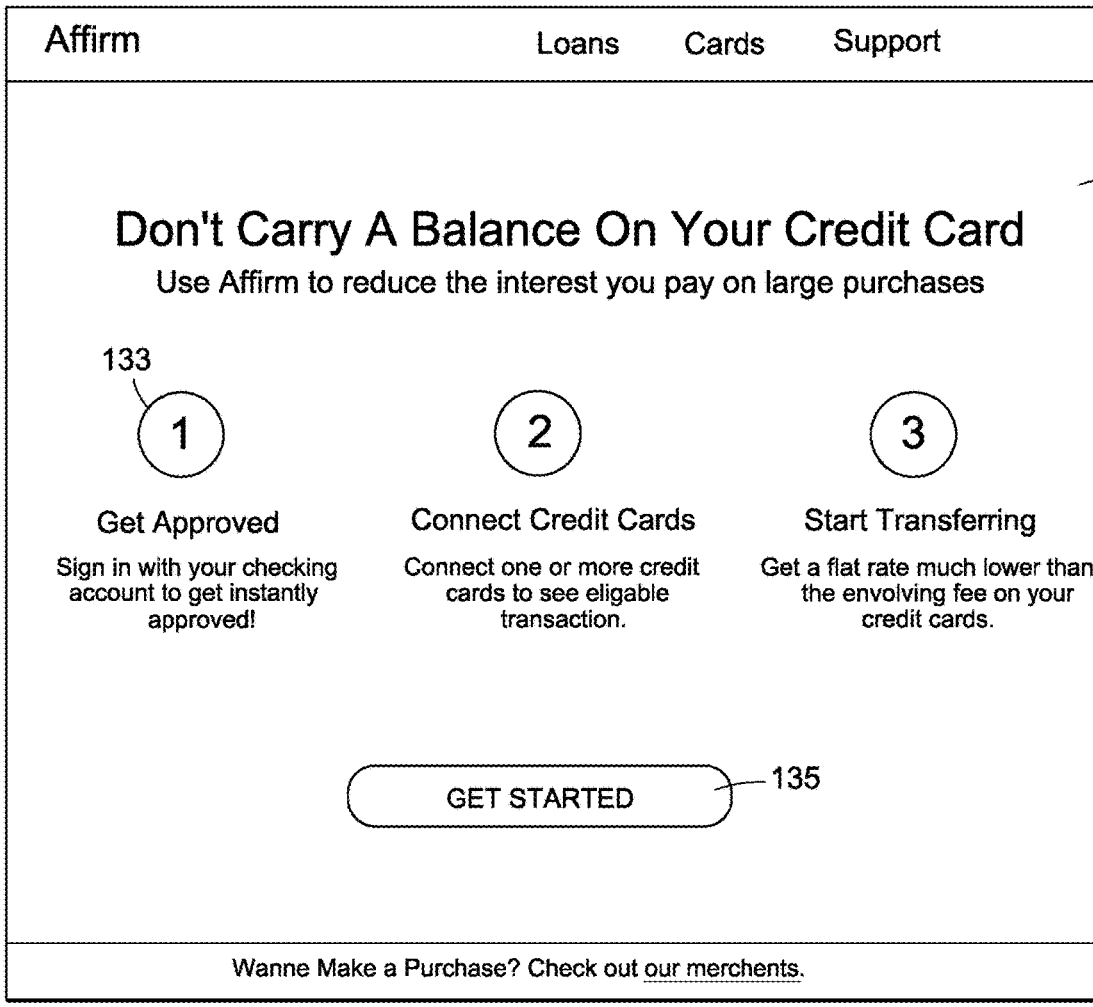
FIG. 3 illustrates a screen shot of an embodiment of a user interface for starting a purchase refinance.

With reference to FIG. 3, a system client can be introduced through a website, app or any other on-line portal to a system for refinancing purchases made with a credit card. The benefits of the refinancing can include: eliminating a balance on a credit card which can result in running interest payments and reducing the interest payments that are normally made to the credit card company. The refinancing can be applied to large purchases which can be difficult to pay within a credit card grace period. The introduction page 131 can include a description of the refinancing program sign up process 133 which can include: approval, credit card connection and transferring a purchase balance. For approval, the client can sign in with a checking account to get approval for the refinancing. Once the approval has been authorized, the system can connect to credit cards to see which eligible credit card transactions can be applied to the refinancing program. Once the client selects an eligible credit card transaction, the purchase can be transferred to the inventive system and the client can pay for the transaction with a flat interest rate that can be substantially lower than the fees associated with the credit card which can include revolving fees and interest. The refinancing can provide a substantial financial savings and/or an improved ease of use and/or an improved ease of understanding of the refinancing terms to the refinancing program clients. If the client wishes to proceed with the approval process, the "get started" button 135 can be actuated.

Figure 4:
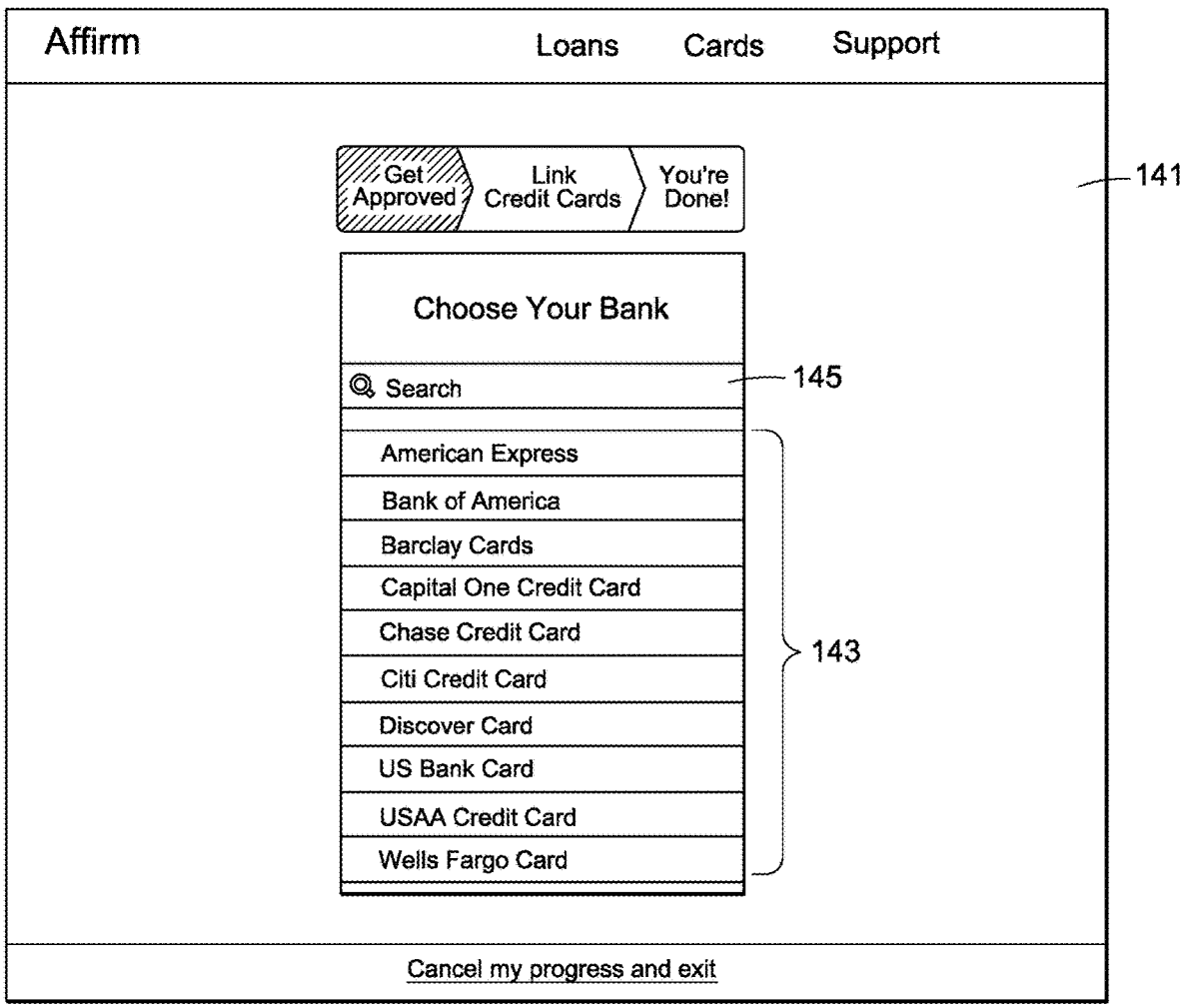
FIG. 4 illustrates a screen shot of an embodiment of a user interface for linking a customer's bank account.
Figure 5:
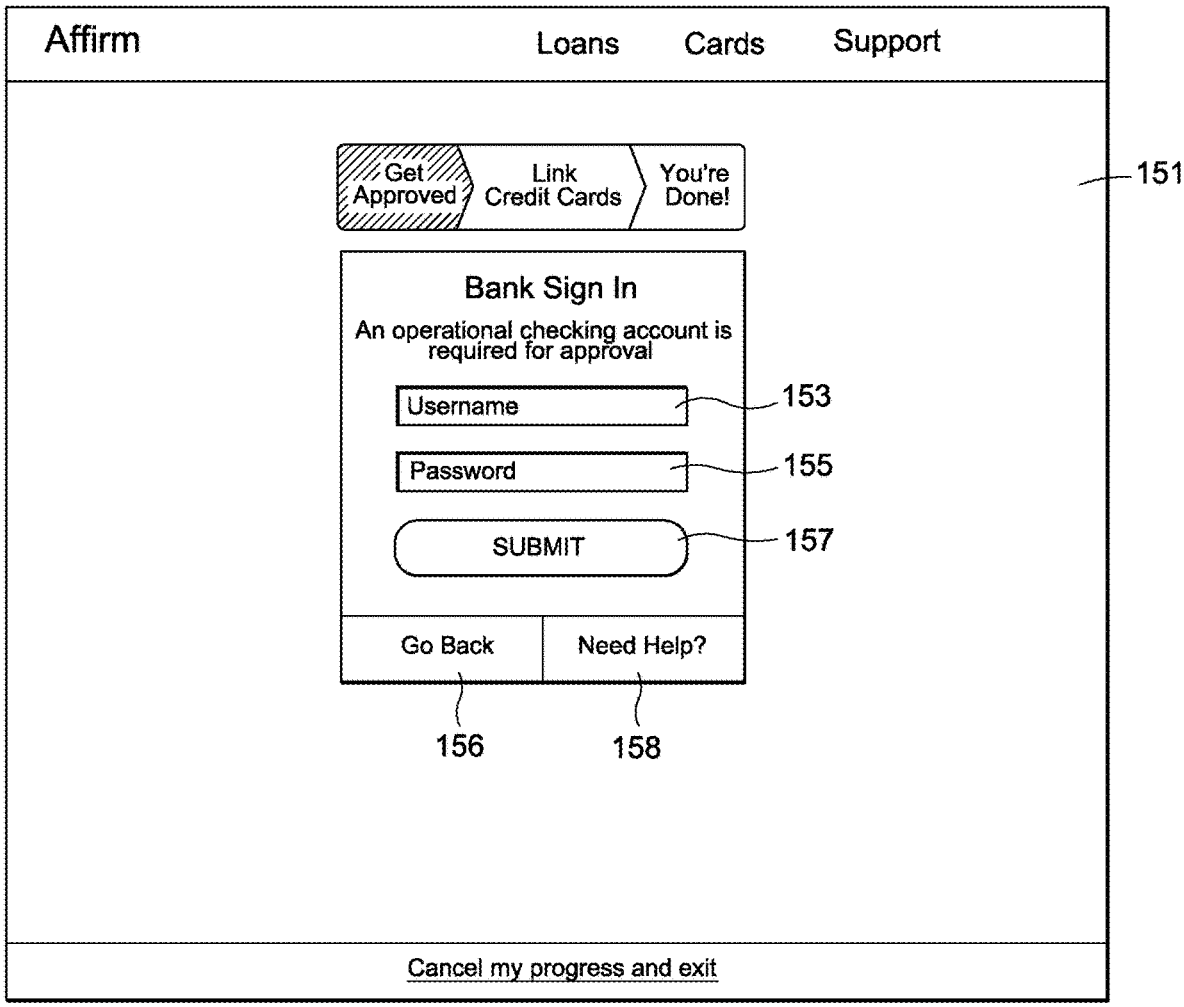
FIG. 5 illustrates a screen shot of an embodiment of a user interface for providing username and password information for a bank account.

With reference to FIG. 4, in an embodiment the refinance program approval process can include inputting a client's checking account information. In the illustrated example, the user interface 141 can display a listing of possible banks 143. The client can click on the client's bank from the list or input the name of the bank in the search box 145. With reference to FIG. 5, once the client's bank has been identified and input, the system can display a bank sign-in screen user interface 151. The client can sign into the bank by inputting a client username 153 and a password 155 for the bank and then clicking on the submit button 157.

Figure 6:
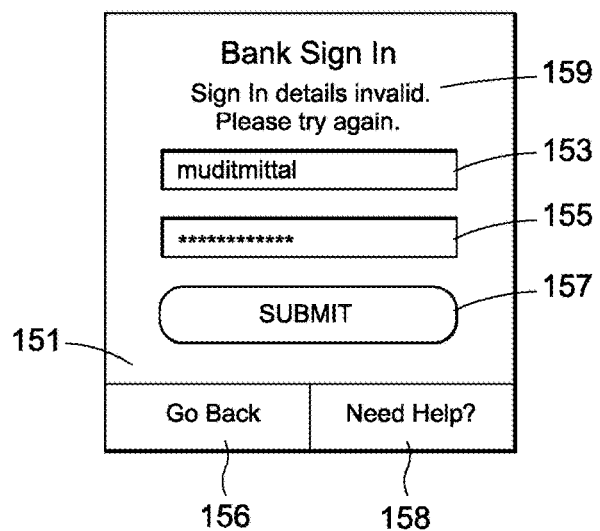
FIGS. 6-8 illustrate screen shots of embodiments of a user interface where errors have occurred when providing username and password information.

With reference to FIG. 6, if an error has been made with the client name or password, the user interface can display an error message such as, "Sign in details invalid. Please try again" 159. The client can respond by inputting the client username 153 and password 155 again. If a maximum number of attempts have been input, the system can stop the client from further attempts to sign into the bank through the user interface 151.

Figure 7:
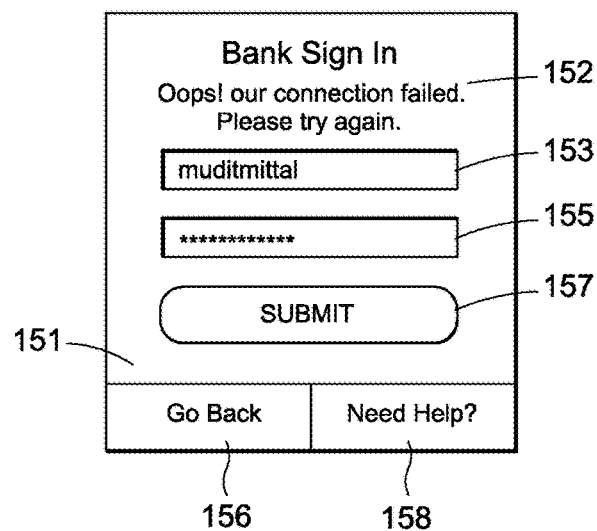
Figure 8:
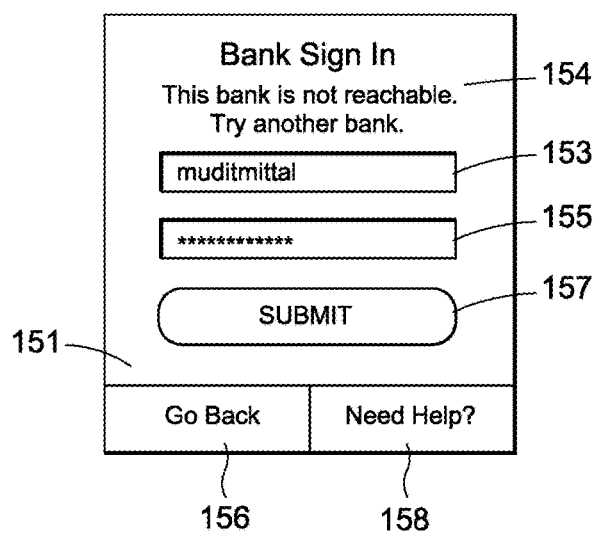

With reference to FIG. 7, if there is a technical error in the bank sign-in, for example an error in the transmittal of information, the system can display a message informing the client of the error. In this example, the system has displayed the message, "Oops! Our connection failed. Please try again" 152. The client can then check to make sure that the device has an active connection through Wi-Fi or cellular service. Once the client connection is confirmed or reestablished, the client can resubmit the client name 153 and password 155. With reference to FIG. 8, if there is an error at the bank that prevents communications, the system can inform the client. In this example, the system can display the message, "The bank is not reachable. Try another bank" 154. The client can then click on the "Go Back" button 156 which can cause the user interface to go back to the previously displayed user interface page. In this example, going back can allow a user to select an alternative bank through the user interface illustrated in FIG. 2 for the program approval process. If assistance is needed, the client can click on the "Need Help?" button 158. In response to actuating the "Need Help?" button 158, customer assistance can be provided. If the client is using a smart phone or computer, the customer assistance take the form of live chat, a phone contact by a customer service representative, a text message or other mobile messaging program contact, an email, a link to a FAQ help site, a searchable help index, or any other suitable form of assistance. The "Go Back" button 156 and the "Need Help?" button 158 are illustrated in other figures in this application.

Figure 9A:
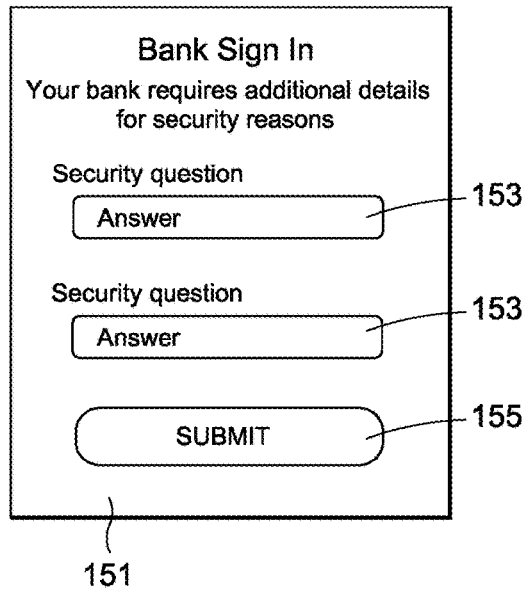
Figure 9B:
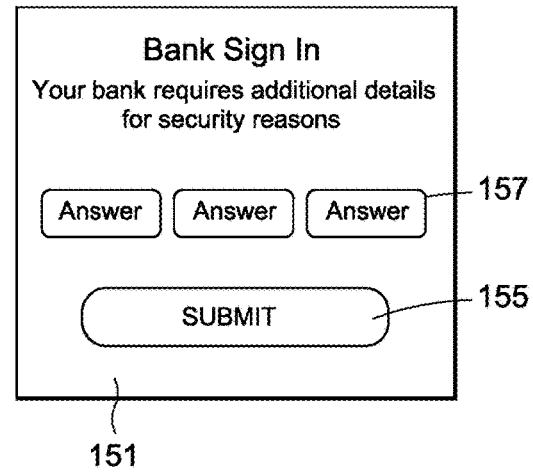
Figure 9C:
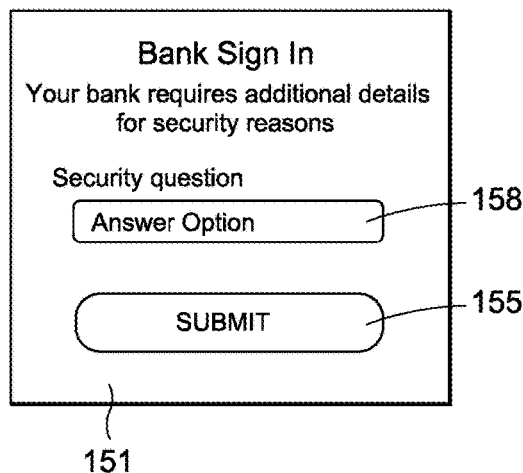
Figure 9D:
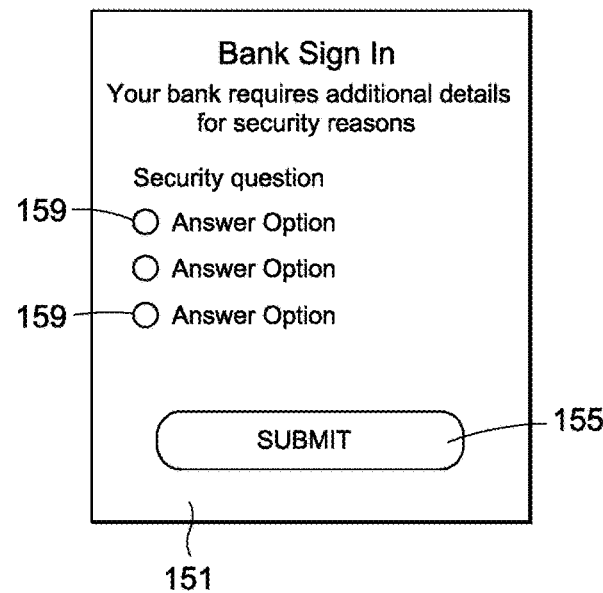

In some embodiments, a multi-factor authentication may be used to perform the bank sign in process. For example, with reference to FIGS. 9A-9D, the system and/or bank may ask the client one or more security questions that the client will need to answer correctly to proceed through the bank sign in process through a user interface 151. With reference to FIG. 9A, in an embodiment the answers to the security questions can be input through typed text in the answer input areas 153. With reference to FIG. 9B, in an embodiment a plurality of security question answers can each be associated with a different answer button 155 that can be selected by the client. With reference to FIG. 9C, the security question answers can alternatively be input through a pull down menu with answer choices in an answer input area 155. With reference to FIG. 9D, in an embodiment a plurality of security question answers can each be associated with a different answer button 159 that can be selected by the client.

The user can submit the input security answers described above by clicking the submit button 155. If the answer to the security question is incorrect, the system may inform the client that the answer does not match the bank stored answer. The system can then ask the client to answer another security question. If the follow up answer is correct, the system can proceed to complete the approval process. If the follow up answer is incorrect, the system can inform the client of the error and either provide additional security questions or stop the approval process.

Figure 10A:
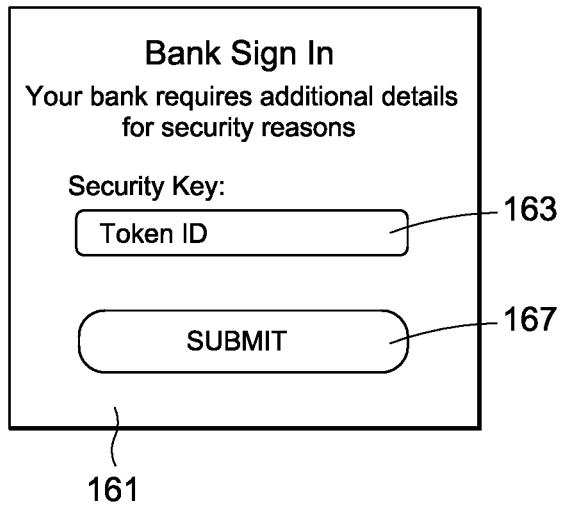
Figure 10B:
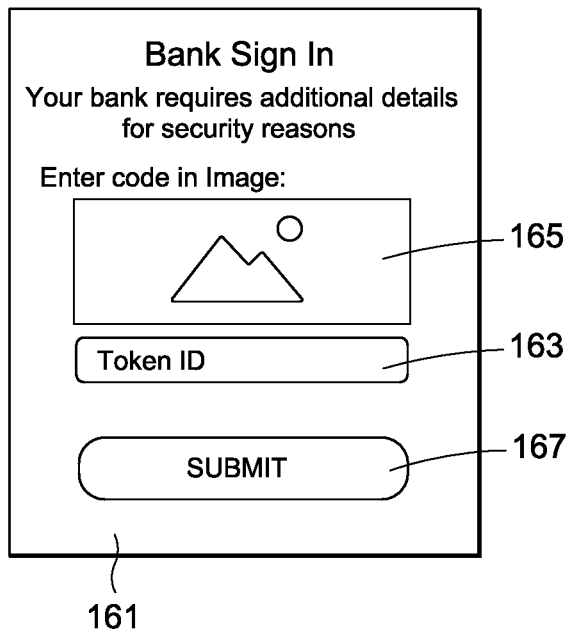

With reference to FIGS. 10A and 10B, in other embodiments, a bank may require a Token ID. In FIG. 10A, the system user interface 161 asks for a Security Key and provides an input for Token ID and the user can type the Token ID in the Token ID space 163. With reference to FIG. 10B, the user interface asks the client to enter a Code in an Image: with an input for the Token ID (like a CAPTCHA) to assist in preventing robots from entering the system. Once the client has input the Token ID, the client can click the SUBMIT button 167. The system can process the client input and if the submitted Token ID is correct, the system can continue the approval process. The Token ID can be a 2-factor authentication device such as a set of printed codes, a code generator, or other method of 2-factor authentication such as sending codes via emails or phone messages (either text or voice), mobile messaging app messages, Facebook messages, or any other sort of message.

Once the system has access to a client's bank account, the system can analyze the client's bank information. The bank access can determine the presence of the client's financial assets and verify the identification of the client. In an embodiment the quantity of assets can indicate the credit worthiness of the refinance applicant. Thus, a client who has more money in a bank account may be given a larger cash value refinance offer than a client who has very little money in a bank account that was used for the sign in. The connection to the bank can be secure, transparent and flexible. In an embodiment, the process can utilize an Internet finance service such as Yodlee to access the client's bank information.

If there is a minimum predetermined assets such as $500 and a history of regular transfers of funds into and from this account, the system can be approved for refinancing based upon the checking account information. In other embodiments, the system can also require a minimum credit report score. For example, the system may obtain a FICO credit report for the client who is applying for the refinancing program. The FICO score can determine if a client is eligible for the refinance program. In an embodiment, a minimum credit score that will be eligible for the refinance program can be 550. Thus, if a client has less than $500 in a checking account with less than 2 transactions in the last 30 days and/or a FICO score of less than 550, this client may not be eligible for the refinance program and will be informed to either provide information for a different bank or that the client is not eligible for the refinance program.

If the user has a FICO score of more than 550 the inventive system can determine the refinancing term limitations of a refinancing offer. The lower range of the refinancing offer can be set to a fixed value. For example, a minimum transaction amount can be $50. The administration costs for refinancing of purchases below $50 might be greater than the interest revenues for this offer and therefore smaller value refinancing can be cost prohibitive. In other embodiments, the lower refinancing offer limit can be any other low monetary value such as $20 to $100.

In an embodiment, the system can provide a range of upper limits for purchase refinancing and the upper monetary value of the refinancing offer can depend upon or be proportional to the user's FICO score. Thus, a first user with a higher FICO score can be given a larger refinance value offer than a second user with a lower FICO score. An upper credit limit for a user transaction refinancing for a user having a credit score that is above a super prime loan rating (FICO above 680) can extend up the maximum value allowed by the system. For example, the upper limit for refinancing can go up to $10,000. Thus, if a user has a FICO score of 680 or more and wishes to refinance purchases between $50 and $10,000 the system can authorize this refinancing. If the user's FICO score is lower, the upper limit of the refinancing offer can be lower. For example, a middle refinance range can be offered to primer users with a FICO score between 620-680. In an embodiment, the prime FICO score user can be authorized to refinance purchases valued between about $50-$3,000. A subprime user with a low FICO score for example below 620 can be authorized by the system to refinance purchases valued between $50-$500. These FICO score ranges and corresponding refinance value offer ranges can be stored on a lookup table based on the memory or system database of the system server.

Although this example shows three different refinance ranges associated with three different ranges of FICO scores, in other embodiments, there can be more refinancing value ranges which can be offered based upon smaller or different ranges of FICO scores or any other consumer credit risk rating scales or systems. In other embodiments, refinance offer value ranges can be fine tuned with transaction information, such as the item, the salary and expense history of a user, etc.

In other embodiments various other methods can be used to determine if a client is eligible for refinancing of eligible purchases. For example, a method for determining credit worthiness is disclosed by U.S. Provisional Patent Application No. 61/917,156, "System And Method Of Transacting" filed Dec. 17, 2013 which is hereby incorporated by reference in its entirety. In these embodiments, the refinance credit worthiness can be determined by a client identity, purchasing history, a merchant, a product SKU and possibly other factors. However, because this information can be less reliable than a FICO score, these methods may only be used for refinancing lower value eligible prior purchases.

Figure 11:
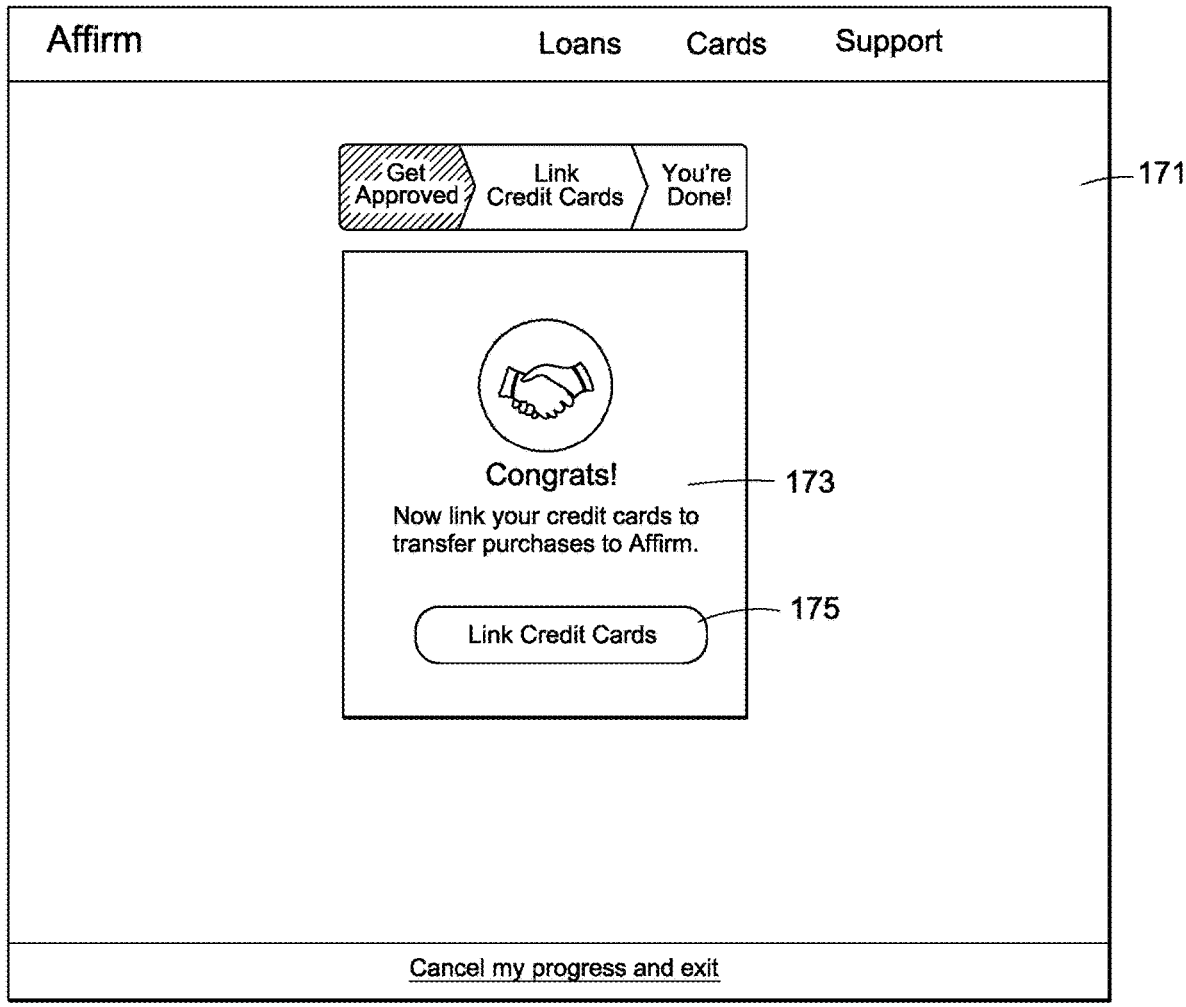
FIG. 11 illustrates a screen shot of an embodiment of a user interface confirming that the user's bank account was linked and inviting the user to transfer credit card purchases.

Based upon the client's bank account information and credit score, the system can approve or reject the client's approval request for refinancing. The system can respond to a client's approval request by: 1) approving a client for the refinance program, 2) requesting more information from the client or 3) not approving the client for the refinance program, or 4) informing the client that he or she is not eligible for the refinance program. With reference to FIG. 11, the user interface 171 can display a message indicating that the client has been approved for the refinancing feature 173. The system can also display a button asking the client to link credit cards to the system 175 so that individual transactions can be reviewed for refinancing.

Figure 12:
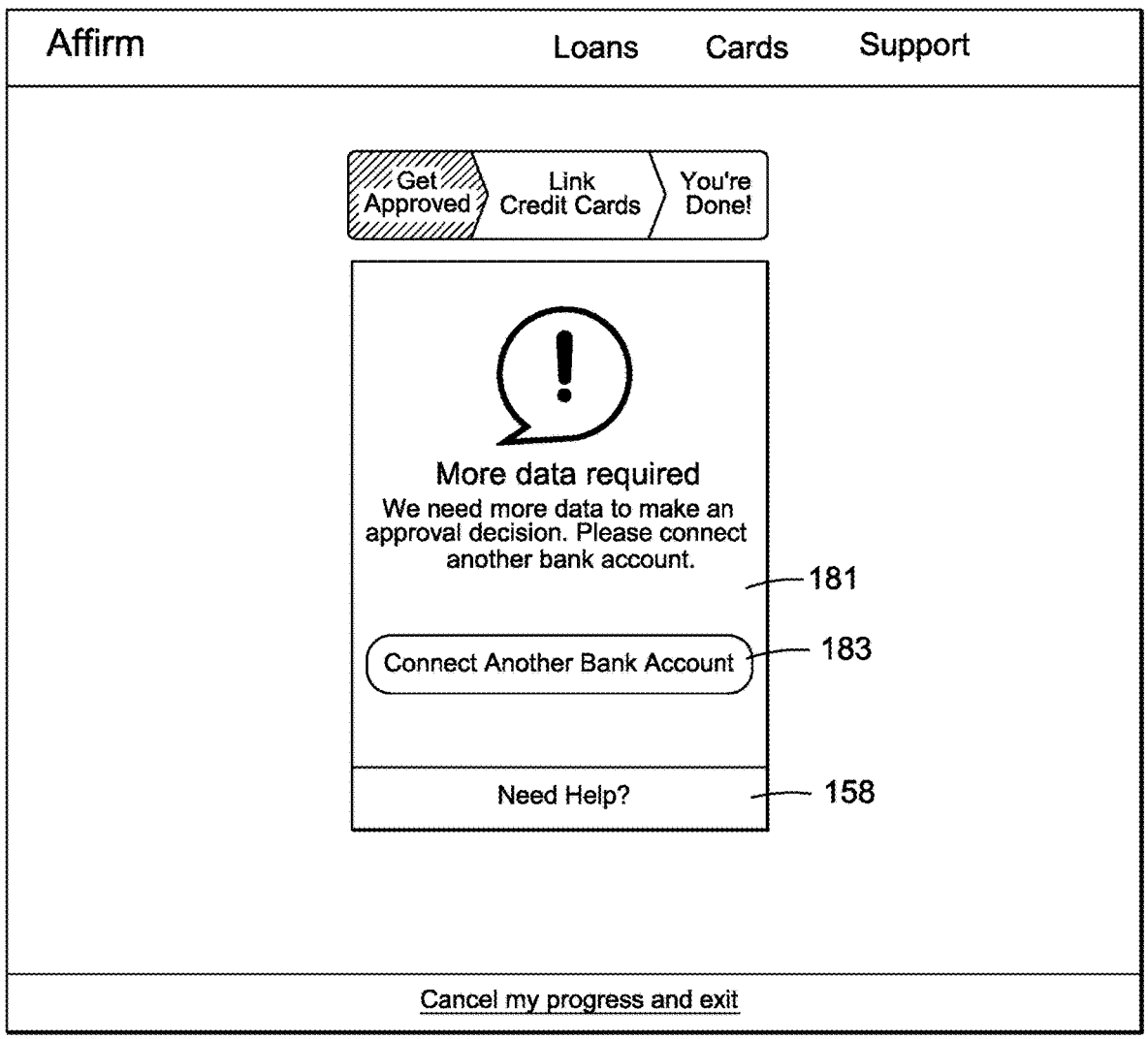
FIG. 12 illustrates a screen shot of an embodiment of a user interface informing the user that more data is needed to make an approval decision and requesting that the user connect another bank account.

With reference to FIG. 12, if more information is needed for approval, the system can ask the client for more information through a user interface 181. In some cases, the bank account information initially provided by the client system may be insufficient for approval. For example, if there are insufficient funds, the system can ask for account information from a different bank. The described above can be repeated with the user clicking the "connect another bank account" button 183 to link a new bank account to the system.

Figure 13:
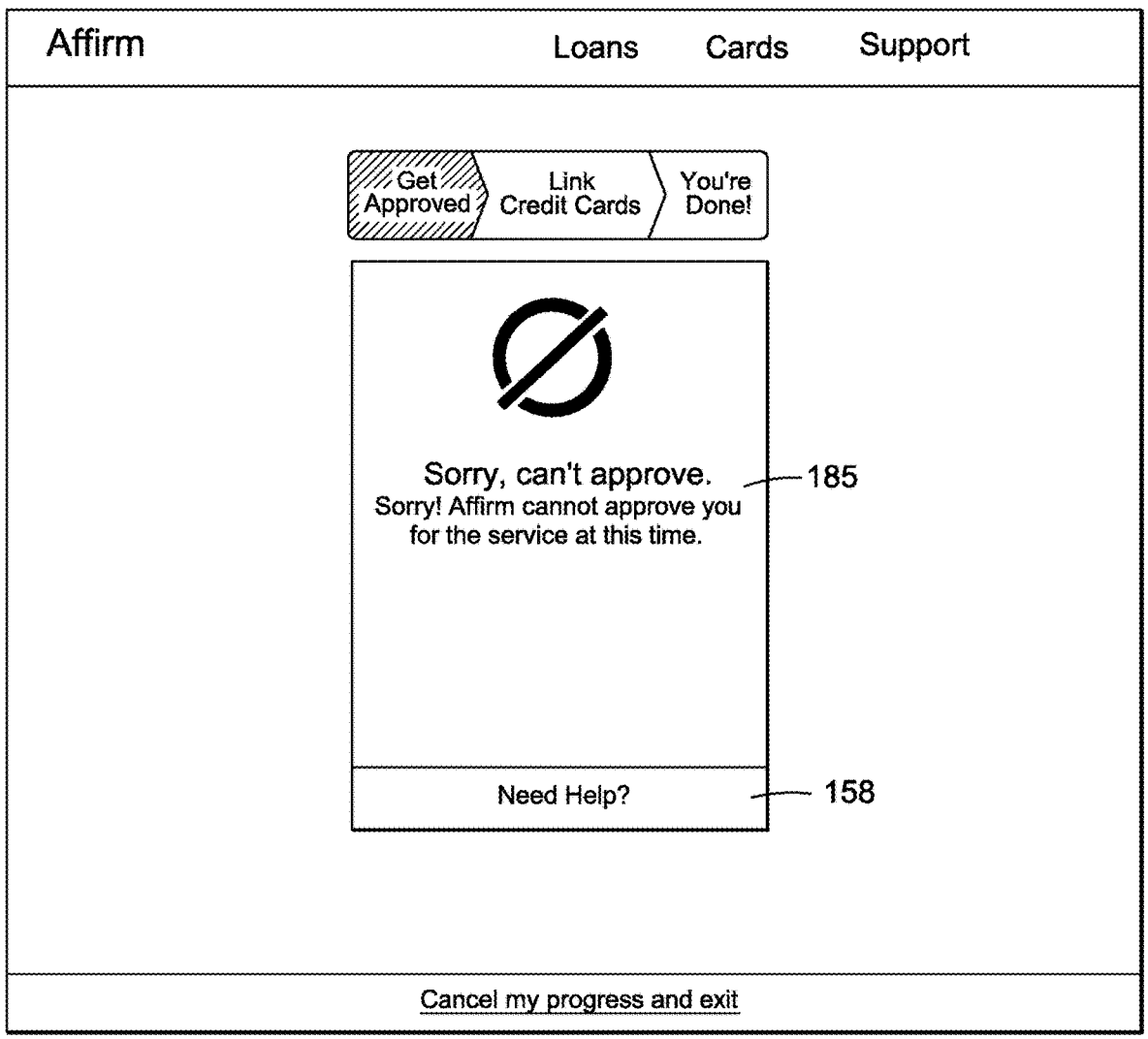
FIG. 13 illustrates a screen shot of an embodiment of a user interface informing the user that the refinancing service cannot be offered to the user at this time.
Figure 14:
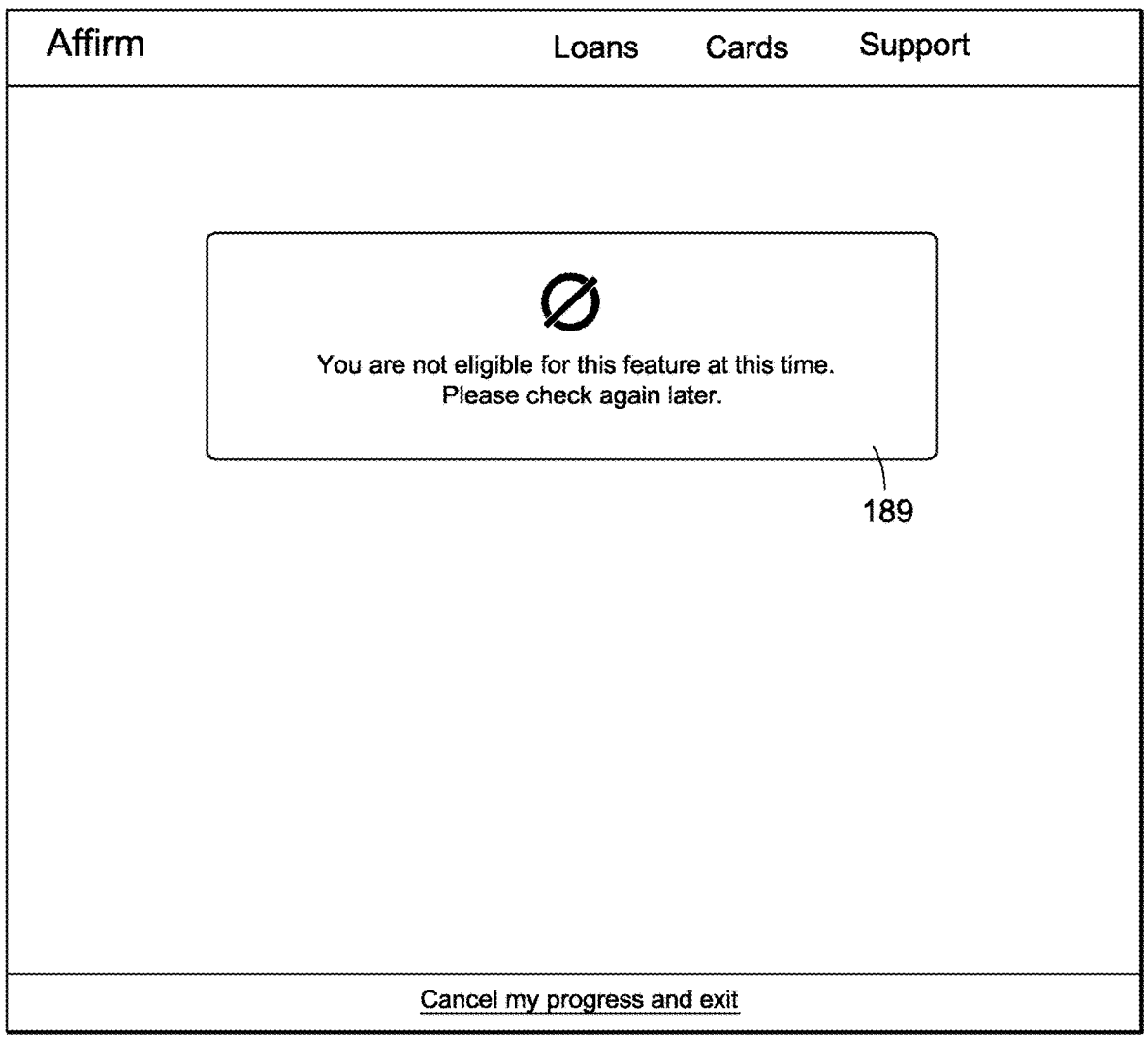
FIG. 14 illustrates a screen shot of an embodiment of a user interface informing the user that the refinancing service cannot be offered to the user at this time.

In some cases, the system may not be able to provide refinancing services. With reference to FIG. 13, if the client has been rejected, the system can display a message informing the client that the system cannot approve the client at this time 185. This can occur if there is information that can indicate that the applicant is not a good credit risk. With reference to FIG. 14, in some situations the client may not be eligible for the refinance program. For example, in an embodiment the applicant may be too young in age to be eligible. The system may determine that the applicant is below the age of 21 and would therefore not be approved for a credit card unless a parent or guardian co-signs for the credit card. In these situations, the system may inform the client that he or she is not eligible for the refinance feature at the time of the application with a message that informs the user that he or she is not eligible, but check back later 189.

Figure 15:
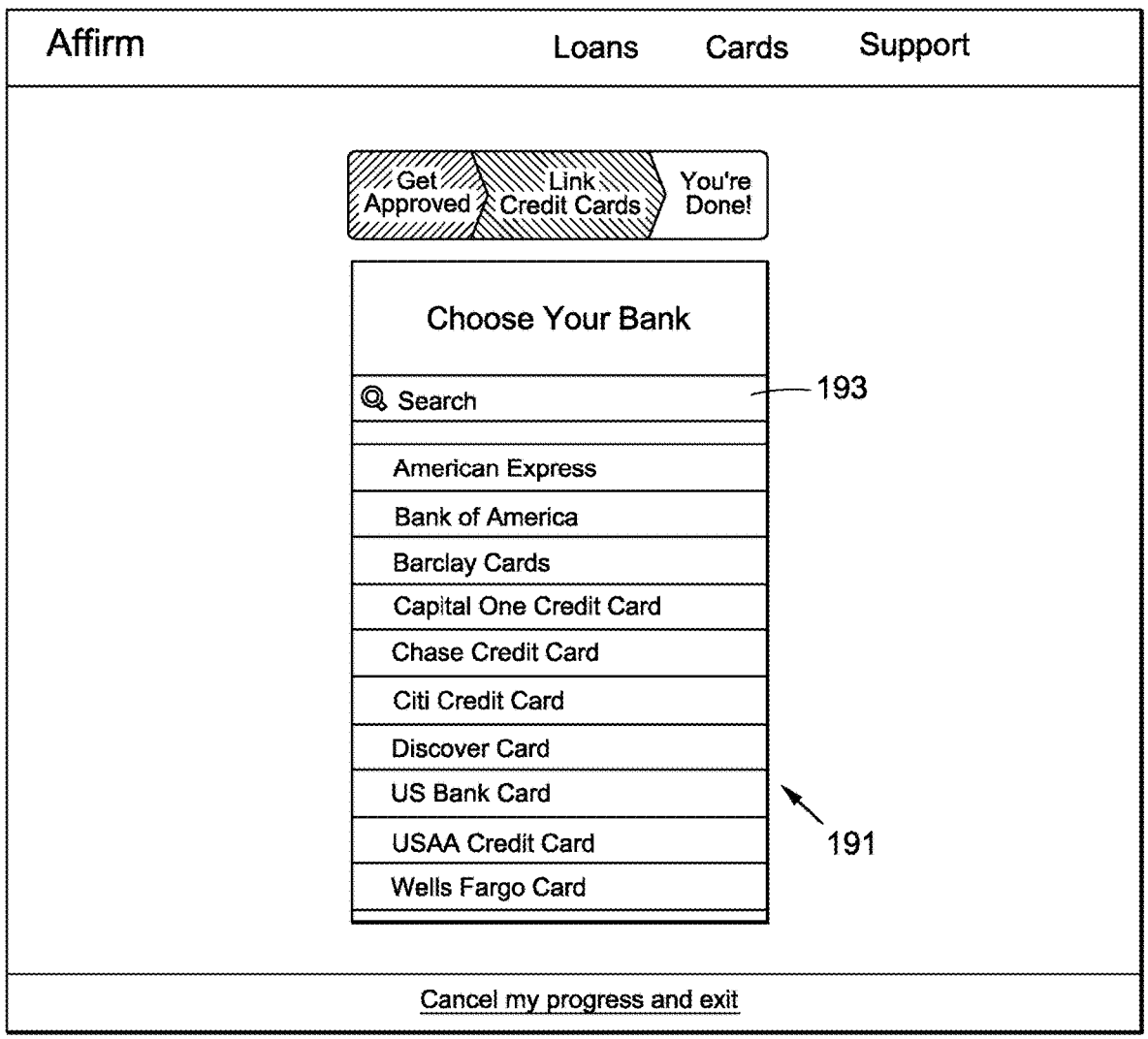
FIG. 15 illustrates a screen shot of an embodiment of a user interface for choosing an issuing bank.

With reference to FIG. 15, once the client has been approved, the system's user interface 191 can ask the client to link credit cards to the refinance program and the client can input the bank that issued the client's credit card in an issuing bank input 193. In this example, the user interface displays a list of credit card providers. The client can click on the provider associated with the client's credit card.

Figure 16:
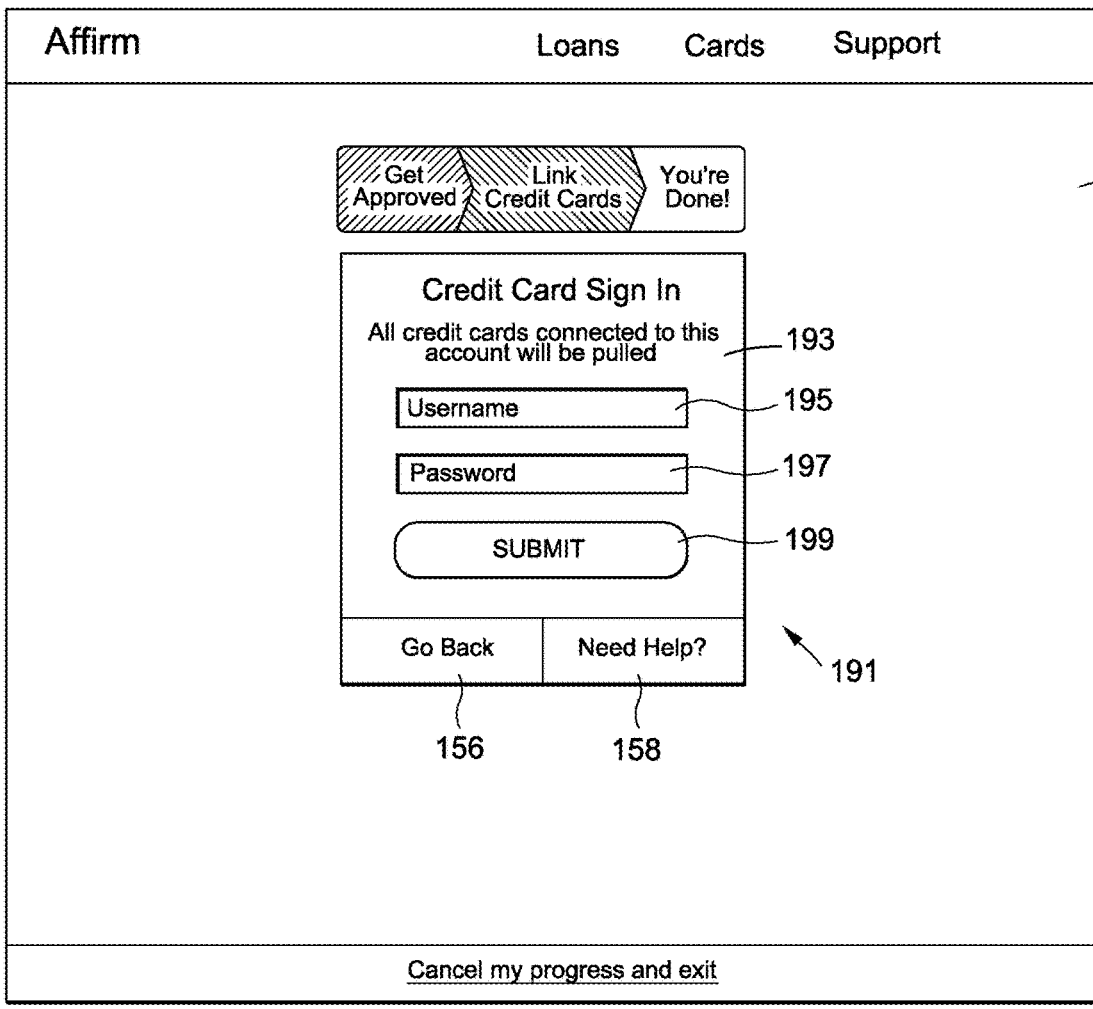

With reference to FIG. 16, the user interface 191 can display a credit card sign in screen. The client can input the client name in a username input space 195 and a password in a password input space 197 that are associated with the credit card. The user can then click on the submit button 199. The system can process this information and if the information matches the user's account send a confirmation message that the client name and password are correct and then link the credit card to the refinance program.

Figure 17:
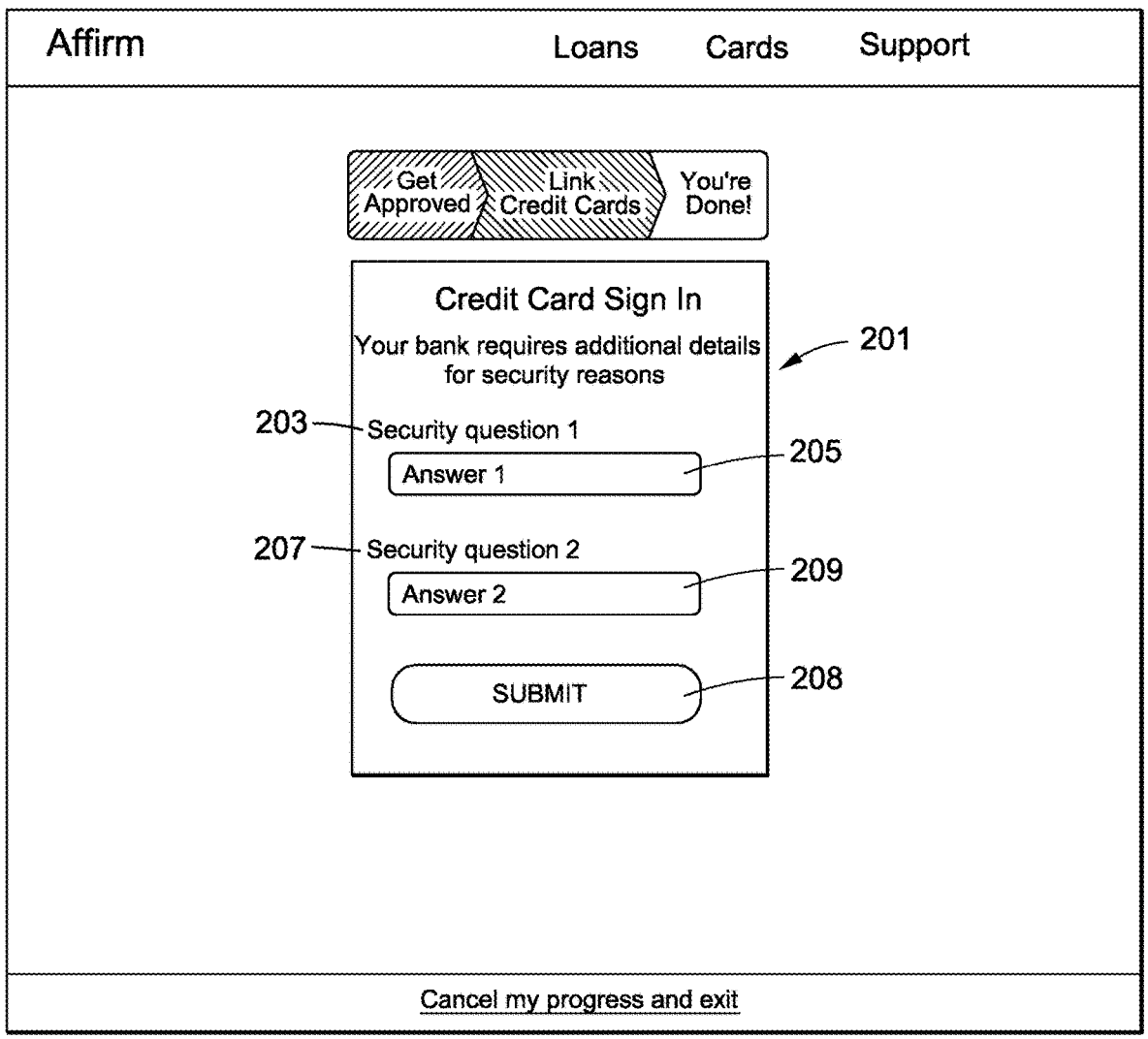

In some embodiments, a multi-factor authentication may be required by the system to link credit cards. With reference to FIG. 17, a multi factor authentication may require the client to answer one or more security questions. In the illustrated example, the user interface 201 can display a first security question 203 and a second security question 207. The user can input the answer to the first security question in the first answer input space 205 and the answer to the second security question in the second answer input space 209. The user can then click on the submit button 208. The system can process this information and if the input information is correct, the system can then confirm that the answer(s) to the security question(s) are correct and then link the credit card to the refinance program.

Figure 18:
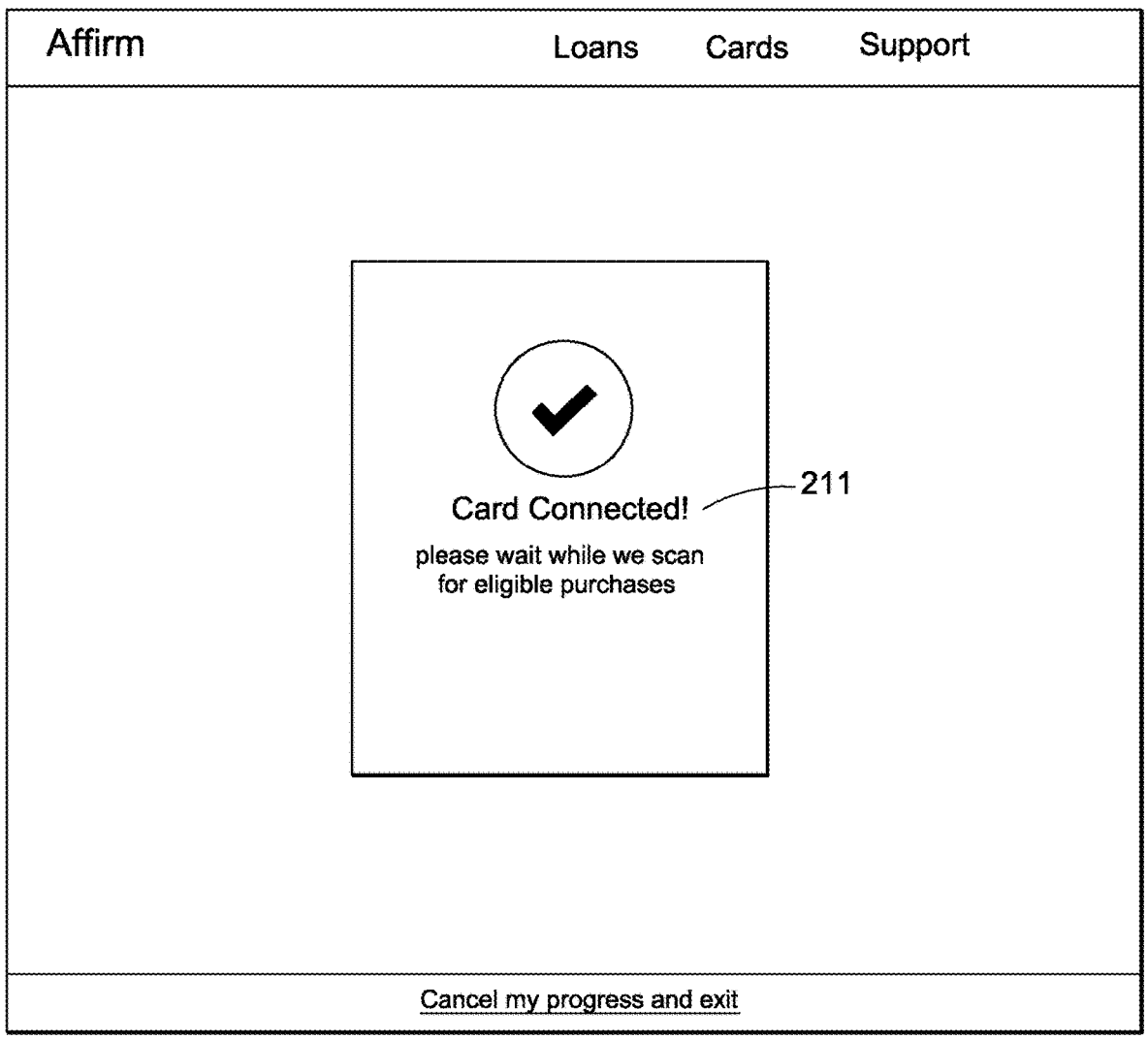
FIG. 18 illustrates a screen shot of an embodiment of a user interface informing the user that the credit card has been connected.
Figure 19:
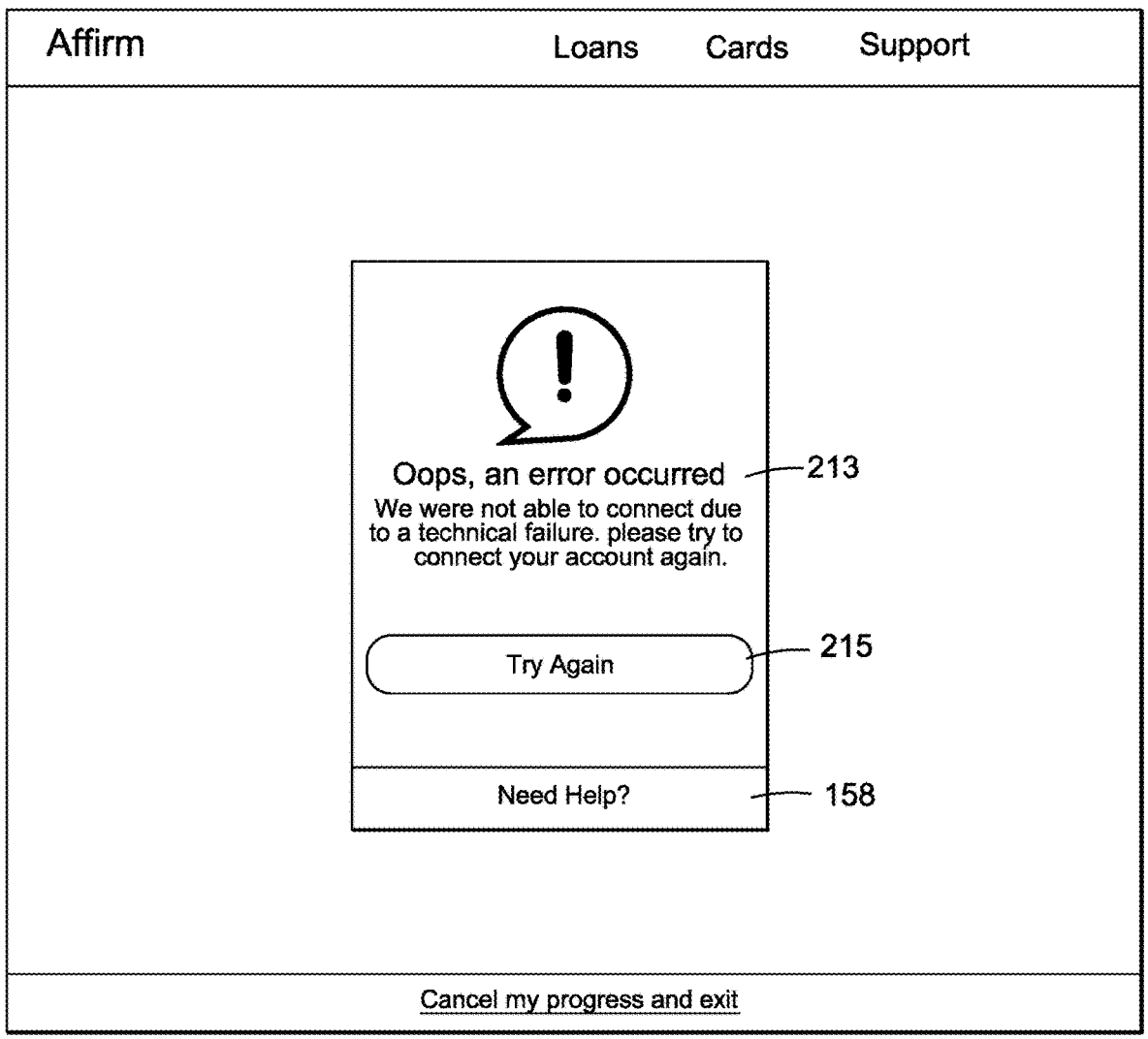
FIG. 19 illustrates a screen shot of an embodiment of a user interface informing the user that an error has occurred when attempting to link the credit card.

With reference to FIG. 18, if the credit card information is correct, the system can display a message 211 informing the client that the credit card has been linked to the refinance program. With the linked credit card, the system can access the client's current credit card transactions to determine transactions that are eligible for refinancing. With reference to FIG. 19, if any errors were made during the linking the credit card, the system can display a message 213 informing the client that an error occurred and that the system was not able to connect to the credit card. The system can ask the client to try to connect to the credit card account again and repeat the described process when the "Try Again" button 215 is clicked by the user.

In addition to determining if a client is eligible for the refinancing program, the credit score information can also be used to determine the refinance terms that can be offered to the client. A client with a higher credit score can be offered refinancing for larger purchases than a client with a lower credit score. For example, in an embodiment the system may offer refinancing of: up to $10,000 for a client having a FICO credit report score of about 740 or above, up to $7,000 for a client having a FICO score of between 641-739 and up to $3,000 for a client having a FICO score of between 600-640. There can also be minimum refinancing requirements. For example, the system may not allow a client to refinance a purchase of less than $200. The examples given are for the US market. Amounts for international markets may vary. In other embodiments, there can be more and other dollar amounts and ranges based upon the credit scores and bank account (such as checking account) information that can be used to determine the refinancing terms to be offered for refinancing eligible prior purchases.

Figure 20:
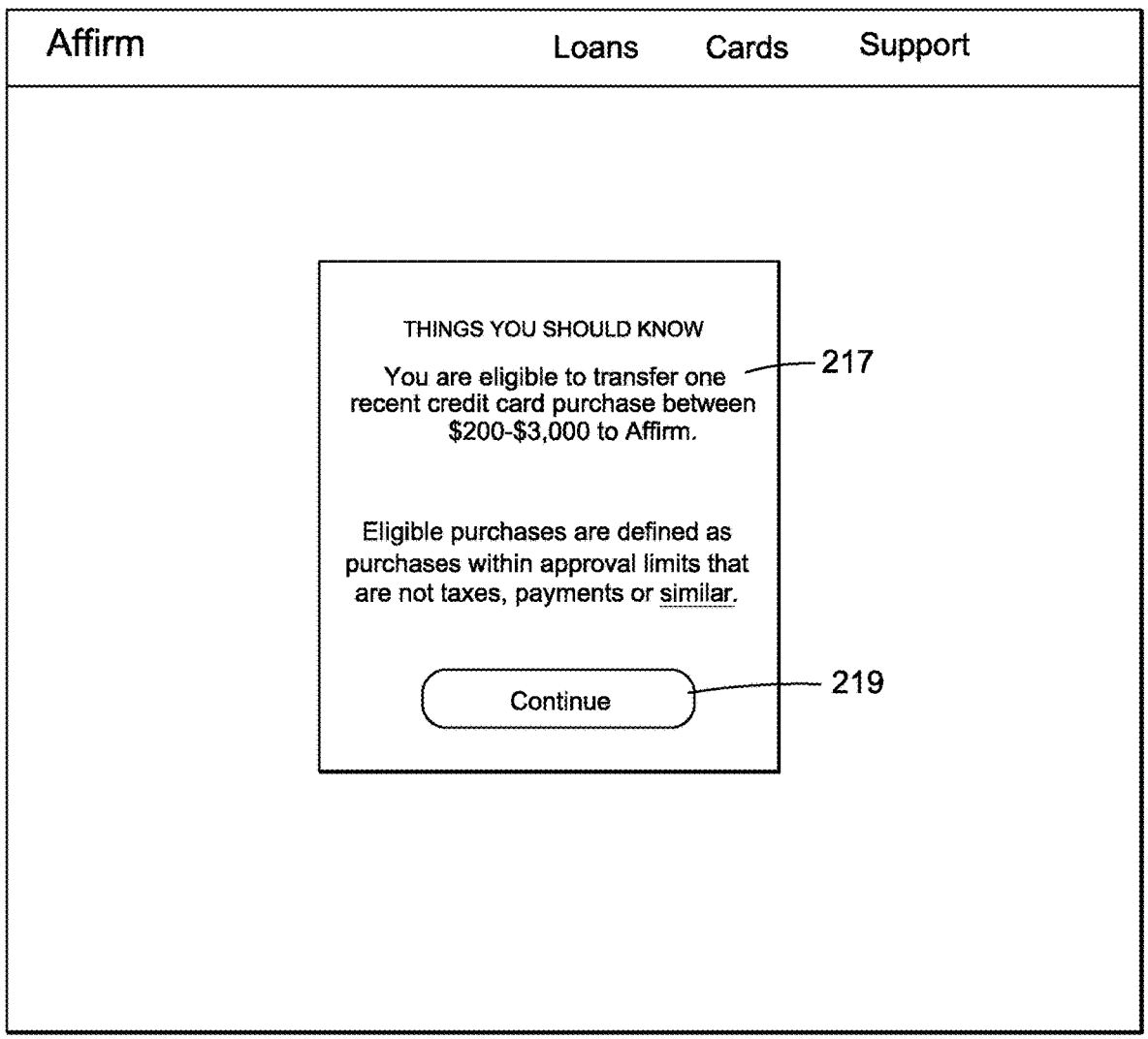
FIG. 20 illustrates a screen shot of an embodiment of a user interface informing the user of eligible credit card purchases for refinancing.

With reference to FIG. 20, the system can inform the client of the transactions that are eligible for refinancing by displaying a message for the user. In this example, the displayed message 217 informs the client one recent "eligible" credit card purchase with a purchase price of $200 to $3,000 is eligible for refinancing. The system can also inform the client that eligible purchases are purchases made within a cost range of $200 to $3,000 and time limit of the last 30 days that are not taxes, payments or similar finance transactions. All purchases that meet the eligible refinance terms are "eligible purchases" and all purchases that do not meet the eligible purchase terms are "ineligible" purchases.

Once the client understands the purchases that are eligible, the client can click the continue button 219 to continue with the refinancing process.

With reference to FIG. 21, the system user interface can display one or more eligible purchases made with the linked credit card(s) on the user interface. The eligible purchases can be individually displayed with each eligible purchase having a button that allows the client to select the transaction for refinancing. In the illustrated example, the eligible purchases include: 1) a $810.32 purchase made on September 17 from Casper 221, 2) a $482.67 purchase made on September 23 from Amazon 223, and 3) a $247.51 purchase made on September 22, from Sears 225. All of these eligible purchases are made within the last 30 days, are for purchases within the $200-$3,000 range and are not for taxes, payments or similar finance transactions. In the illustrated example, the client would be able to select any single purchase for refinancing. In an embodiment, the user can click on the Transfer button 227 to proceed with the refinancing of the selected transaction.

In other embodiments, the system may not restrict refinancing to a single purchase. For example, the system may allow the client to refinance multiple eligible purchases if the cumulative refinancing is within the refinance terms. In the illustrated example, the client may be able to refinance all three of the eligible purchases $810.32+$482.67+$247.51=$1,540.50 because the cumulative value is within the refinance terms. In an embodiment, the user can click on multiple Transfer buttons 227 to proceed with the refinancing of the user-selected transactions.

The system may also display one or more purchases that are not eligible for refinancing. In this example, the system displays a $546.28 payment on September 17 to Chase Payment 229. In an embodiment, the user can ask for a reevaluation of the transaction's eligibility for refinancing. The system displays the text, "Should this be eligible?" and the user can click on the "Let us know" button 231 to initiate a reevaluation process through which the client can inform the system why the transaction should be an eligible purchase.

In this example, all of the eligible and non-eligible purchases are from a single credit card "Visa ****1234." However, in other embodiments, if multiple credit cards are linked to the system, purchases from all of the credit cards can be displayed on the eligible transactions page of the user interface.

With reference to FIG. 22, in some situations, the client may not have any eligible purchases. The system may display a message informing the client that there are not any eligible purchases right now 233. The system can display a link "Learn More" button 235 which can be clicked so that the system will provide more information about the rules distinguishing eligible and ineligible purchases.

The system can use a machine analysis to determine if a purchase is eligible or ineligible. In some cases, the system may accidentally categorize a purchase as not being eligible when the purchase should have been eligible for refinancing. The system may display a button that can allow a client to inform the system that a purchase should be eligible. In this example, if the client clicks on a "Let us know" button 231, the client can inform the system why the transaction should be an eligible purchase. In other embodiments, the user can click a "Request financing" button to initiate the eligibility analysis.

In some cases, the system may have misinterpreted client transactions and classified the transactions into an ineligible category. For example, the system may have accidentally interpreted as a client purchase as a payment for another client credit card (for example an Amazon credit card payment) when the purchase was made for purchasing goods (through Amazon). The system or a system administrator can review the client's request and either agree or disagree with the client's classification of the transaction. Once the client submits the eligibility information, the system can display a receipt confirmation message.

With reference to FIG. 23, an example of a system message is illustrated. In this example, the system sends a message to the client that thanks the client for letting the system know and informs the client that an email notification will be sent if the eligibility status of the purchase is updated 241. If the system agrees with the client, the purchase can be moved to the eligible purchase section so that the client for refinancing can select the purchase.

In the illustrated example, the client can select one eligible purchase for refinancing. However, in other embodiments, the system may allow the client to select multiple purchases. The same rules for eligible purchases may be applicable. For example, multiple eligible purchases can be selected for refinancing as long as the cumulative selected purchases are within the eligibility limitations discussed with reference to FIG. 20.

In some cases there can be connection errors with the credit card information. For example with reference to FIG. 24, if the Bank Login expires, the system can display a message that informs the client, "Your card ending ***1234 got disconnected. Please login again to see eligible purchases" 243. The system can display a "connect card again" button 245 and a "cancel" button 247. Clicking the connect card again button 245 will cause the system to attempt to login again to the credit card while clicking the cancel button 247 will cause the system to cancel the connection with the credit card. If the client has linked multiple credit cards and all of the corresponding bank logins expire at the same time, the system can interpret this as a connection error. With reference to FIG. 25, the system can display a disconnection error message to the client. In this example, the system displays the message, "Sorry, your connected card got disconnected. Please log in again to see eligible purchases" 251.

Once the client selects an eligible purchase for refinancing, the system can then provide refinancing terms to the client. In some embodiments, the system may display a plurality of repayment options with different durations. For example, a client may be able to select the duration of the repayment from a few months to a few years. The system may display the interest rate as an annual percentage rate (APR) and the monthly payments required by each repayment option. For example, if the client selects the $810.32 purchase for refinancing the repayment options for can be illustrated in Table 1 below. In an embodiment, the durations and interest rates being offered for repayment can be based upon the credit worthiness of the client. A client with a poor credit score may be offered shorter repayment durations and higher interest rates than a client with good credit score.

TABLE 1

| Option | Duration | Interest (APR) | Monthly Payment | Total Payments |
|--------|----------|----------------|-----------------|----------------|
| 1 | 6 months | 6% | $137.43 | $824.58 |
| 2 | 1 year | 7% | $70.11 | $841.32 |
| 3 | 1.5 years | 8% | $47.92 | $862.56 |
| 4 | 2 years | 9% | $37.02 | $888.48 |

In other embodiments, the interest rates and upper limit refinancing offered can be based upon historical and/or statistical model repayment information rather than the user FICO scores. If there is a high correlation between predicting the likelihood of repayment and user information, the system can utilize this user information to set the interest rates and the upper limit of the refinancing offered.

Once the client has selected the repayment plan and agreed to the terms of the repayment plan, the system can pay the balance for the selected eligible purchase to the credit card company and can require monthly payments to be paid from the client to the refinance service provider. Various other methods can be used to allow a client to select a payment plan that best suits the client's needs. In other embodiments the system may offer the client a custom repayment plan that can be configured by the client as discussed in U.S. Provisional Patent Application No. 61/992,984, "Tools For Purchasing Transactions" filed May 14, 2014 which is hereby incorporated by reference in its entirety.

In an embodiment the client can electronically withdraw the monthly payments from the client's bank checking account when they are due for the duration of the loan. In other embodiments, the client can mail physical checks to pay the monthly amount due. When the payments are complete, the client can discontinue to make payments to the refinance service provider.

In an embodiment, the completion of the repayment of the loan can allow the client to refinance another purchase using the same described system. However, in other embodiments, the system may allow for refinancing of other eligible purchases before the repayment of the first loan has been completed.

A problem with credit cards is that once a credit card holder does not pay the entire balance within the grace period, all purchases from the expiration of the grace period will be charged interest. This type of debt can become "revolving credit" which can have a very high interest rate, such as an APR of 12-23%. In addition, the actual interest being charged by a credit card issuer can be compounded daily and therefore the effective interest rate can be significantly higher. The present invention can prevent the client from transitioning into having to pay credit card interest by allowing the client to pay off the entire balance when a large purchase is necessary. As discussed, the system can pay a portion of the credit card so that the user can pay off the remainder of the balance. Because the credit card balance has been paid, the credit card interest is not charged to the client. Although the system is loaning the client money for repayment of the eligible purchase, the client will effectively be paying less out of pocket than if the client did not refinance the purchase.

In an embodiment, the system may be able to make recommendations to the client. For example, when the system accesses the user's credit card information, the system can see a 90-day history of the client transactions. The system can then analyze all of the purchases that were made that are being charged revolving credit card interest and based upon this information the system can determine or calculate the amount of money that the client has spent or will spend on credit card interest before the prior purchases are paid off. In an embodiment, the system can then display an objective comparison of how much money the client would save by utilizing the refinancing program for any of the purchases through a user interface. The display of this information can be in the form of a recommendation based upon the amount of money that can be saved by refinancing. For example, the system may display a message stating, "Based upon a 90-day past history analysis of your credit card activity, we recommend refinancing the Sep. 17, 2014, $810.32 eligible prior purchase from Casper using your Visa ****1234 card." If the entire credit card balance is not paid by Oct. 2, 2014, the client will be paying 23% interest on any remaining balance. If the client only makes the minimum payments, for example, $15 per month for this purchase, it will take 8.2 years to pay for this purchase with a total interest charge of $853.76. In an embodiment, the system can make a direct comparison of the difference between refinancing and not refinancing. With reference to Table 2 below, the monthly payments for an $810.32 purchase are calculated based upon an interest rate of 23% or whatever interest the credit card is actually charging the client. The system can utilize the same durations and then calculate the total (or monthly) savings that would be achieved by refinancing the purchase. Based upon this information, the client can make an informed decision about refinancing eligible prior purchases.

TABLE 2

| Option | Duration | Interest (APR) | Monthly Payment | Total Payments | Refinance Savings |
|---|---|---|---|---|---|
| 1 | 6 months | 23% | $144.19 | $865.14 | $40.56 |
| 2 | 1 year | 23% | $76.20 | $914.40 | $73.08 |
| 3 | 1.5 years | 23% | $53.63 | $965.34 | $102.78 |
| 4 | 2 years | 23% | $42.42 | $1,018 | $129.60 |

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. As a person skilled in the art will recognize from the previous detailed description and from the figures, modifications and changes can be made to the preferred embodiments of the invention without departing from the scope of this invention.

What is claimed is:

1. A method for displaying refinancing information for eligible prior purchases on a client computer in communication with a finance server, the method comprising:
determining, by the finance server, a first credit card transaction and a second credit card transaction that are eligible for refinancing, the first and second credit card transactions being eligible for refinancing based on being above a predetermined minimum value;
determining refinancing terms for the first and second credit card transactions;
simultaneously causing display, at the client computer, of both the first and second credit card transactions along with a first selectable element for refinancing the first credit card transaction and a second selectable element for transferring the second credit card transaction; and
responsive to selection of either the first or second selectable elements at the client computer, causing display of the refinancing terms for a selected one of the first credit card transaction and the second credit card transaction at the client computer,
wherein the refinancing terms for the selected one of the first credit card transaction and the second credit card transaction define a number of monthly payments and a refinancing fee.

2. The method of claim 1, further comprising providing a client database in communication with the finance server, and saving bank account sign-in information and credit card sign-in information for a client in the client database.

3. The method of claim 1, wherein the client computer is a mobile phone.

4. The method of claim 1, wherein causing display of the refinancing terms for the selected one of the first credit card transaction and the second credit card transaction includes causing display of multiple options for the number of monthly payments and the refinancing fee for each respective one of the multiple options.

5. The method of claim 1, wherein responsive to both the first selectable element and the second selectable element being selected, the finance server further causes displaying, on a display of the client computer, loan repayment information for a combination of the first and second credit card transactions.

6. The method of claim 5, further comprising causing display of a cumulative total of the combination of the first and second credit card transactions and the refinancing fee.

7. The method of claim 1, wherein causing display of the refinancing terms for the selected one of the first credit card transaction and the second credit card transaction comprises causing display of multiple options for the number of monthly payments, an amount of each of the monthly payments, and the refinancing fee for each respective one of the multiple options.

8. The method of claim 7, further comprising causing display of a cumulative total of the combination of the amount of each of the monthly payments and the refinancing fee.

9. The method of claim 1, wherein the first and second credit card transactions are associated with a same credit card.

10. The method of claim 1, wherein the first and second credit card transactions are associated with different credit cards.

11. An apparatus for facilitating refinancing transactions for eligible prior purchases on a client computer in communication with a finance server, the apparatus comprising processing circuitry configured to:
determine a first credit card transaction and a second credit card transaction that are eligible for refinancing, the first and second credit card transactions being eligible for refinancing based on being above a predetermined minimum value range;
determine refinancing terms for the first and second credit card transactions;
simultaneously cause display, at the client computer, of both the first and second credit card transactions along with a first selectable element for refinancing the first credit card transaction and a second selectable element for transferring the second credit card transaction; and
responsive to selection of either the first or second selectable elements at the client computer, cause display of the refinancing terms for a selected one of the first credit card transaction and the second credit card transaction at the client computer,
wherein the refinancing terms for the selected one of the first credit card transaction and the second credit card transaction define a number of monthly payments and a refinancing fee.

12. The apparatus of claim 11, wherein the processing circuitry is further configured to provide a client database in communication with the finance server, and save bank account sign-in information and credit card sign-in information for a client in the client database.

13. The apparatus of claim 11, wherein the client computer is a mobile phone.

14. The apparatus of claim 11, wherein causing display of the refinancing terms for the selected one of the first credit card transaction and the second credit card transaction includes causing display of multiple options for the number of monthly payments and the refinancing fee for each respective one of the multiple options.

15. The apparatus of claim 11, wherein responsive to both the first selectable element and the second selectable element being selected, the processing circuitry is further configured to cause displaying on a display of the client computer loan repayment information for a combination of the first and second credit card transactions.

16. The apparatus of claim 15, wherein the processing circuitry is further configured to cause display of a cumulative total of the combination of the first and second credit card transactions and the refinancing fee.

17. The apparatus of claim 11, wherein causing display of the refinancing terms for the selected one of the first credit card transaction and the second credit card transaction includes causing display of multiple options for the number of monthly payments, an amount of each of the monthly payments, and the refinancing fee for each respective one of the multiple options.

18. The apparatus of claim 17, wherein the processing circuitry is further configured to cause display of a cumulative total of the combination of the amount of each of the monthly payments and the refinancing fee.

19. The apparatus of claim 11, wherein the first and second credit card transactions are associated with a same credit card.

20. The apparatus of claim 11, wherein the first and second credit card transactions are associated with different credit cards.

* * * * *